United States Patent
Song et al.

(10) Patent No.: US 9,420,293 B2
(45) Date of Patent: Aug. 16, 2016

(54) IMAGE CODING/DECODING DEVICE USING CODING BLOCK IN WHICH INTRA BLOCK AND INTER BLOCK ARE MIXED, AND METHOD THEREOF

(75) Inventors: Jinhan Song, Seoul (KR); Jeongyeon Lim, Gyeonggi-do (KR); Jongki Han, Seoul (KR); Yunglyul Lee, Seoul (KR); Joohee Moon, Seoul (KR); Haekwang Kim, Seoul (KR); Byeungwoo Jeon, Gyeonggi-do (KR); Min Jae Kim, Seoul (KR); Hyoungmee Park, Seoul (KR); Chanwon Seo, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 649 days.

(21) Appl. No.: 13/698,499

(22) PCT Filed: May 13, 2011

(86) PCT No.: PCT/KR2011/003541
§ 371 (c)(1),
(2), (4) Date: Nov. 16, 2012

(87) PCT Pub. No.: WO2011/145836
PCT Pub. Date: Nov. 24, 2011

(65) Prior Publication Data
US 2013/0064292 A1    Mar. 14, 2013

(30) Foreign Application Priority Data
May 17, 2010  (KR) .......................... 10-2010-0046176

(51) Int. Cl.
*H04N 19/176*    (2014.01)
*H04N 19/61*    (2014.01)
(Continued)

(52) U.S. Cl.
CPC ............. *H04N 19/109* (2014.11); *H04N 19/11* (2014.11); *H04N 19/176* (2014.11); *H04N 19/61* (2014.11)

(58) Field of Classification Search
CPC ... H04N 19/176; H04N 19/109; H04N 19/11; H04N 19/61; H04N 7/32
USPC .................................................... 375/240.03
See application file for complete search history.

(56) References Cited

U.S. PATENT DOCUMENTS

2003/0058238 A1 * 3/2003 Doak et al. .................... 345/419
2004/0252768 A1 * 12/2004 Suzuki ................. H04N 19/105
                                                                375/240.24

(Continued)

FOREIGN PATENT DOCUMENTS

CN         1476253 A       2/2004
CN       101500167 A       8/2009
(Continued)

OTHER PUBLICATIONS

International Search Report mailed Jan. 19, 2012 for PCT/KR2011/003541, citing the above references.

*Primary Examiner* — Reza Aghevli
(74) *Attorney, Agent, or Firm* — Hauptman Ham, LLP

(57) ABSTRACT

A video encoding/decoding apparatus includes: a video encoder for dividing coding unit block into combination of subblocks of codable size, determining combination of inter blocks and intra blocks with respect to each subblock, determining encoding order of intra encoding blocks within coding unit considering referencing possibility of peripheral pixel values of current block to be intra-prediction encoded, bi-directional intra prediction encoding the current block in determined encoding order, and transmitting encoding mode/size information of subblocks after locating encoding mode/size information in front of a syntax of the coding unit; and a video decoder for restoring encoding mode/size information of subblocks within the coding unit by decoding encoded data, reconstructing inter prediction encoded blocks, based on restored encoding mode information, and determining decoding order of intra prediction mode blocks according to encoding mode/size information of each subblock within coding unit, and conditions on referencing possibility of peripheral blocks of coding unit.

17 Claims, 47 Drawing Sheets

(51) Int. Cl.
*H04N 19/11* (2014.01)
*H04N 19/109* (2014.01)

(56) References Cited

U.S. PATENT DOCUMENTS

| | | | |
|---|---|---|---|
| 2005/0046702 A1* | 3/2005 | Katayama et al. | 348/222.1 |
| 2005/0135484 A1* | 6/2005 | Lee | H04N 19/176 375/240.16 |
| 2007/0014478 A1* | 1/2007 | Birinov | H04N 19/159 382/236 |
| 2007/0063997 A1* | 3/2007 | Scherer et al. | 345/419 |
| 2008/0136923 A1* | 6/2008 | Inbar et al. | 348/208.2 |
| 2008/0144723 A1* | 6/2008 | Chen | H04N 19/15 375/240.26 |
| 2008/0159641 A1* | 7/2008 | Moriya | H04N 19/139 382/239 |
| 2008/0267290 A1* | 10/2008 | Barbieri et al. | 375/240.13 |
| 2009/0003441 A1* | 1/2009 | Sekiguchi | H04N 19/176 375/240.13 |
| 2009/0034857 A1* | 2/2009 | Moriya | H04N 19/176 382/238 |
| 2009/0190660 A1 | 7/2009 | Kusakabe et al. | |

FOREIGN PATENT DOCUMENTS

| | | |
|---|---|---|
| KR | 10-0642043 | 11/2006 |
| KR | 10-0723507 | 5/2007 |
| KR | 10-0951301 | 4/2010 |

* cited by examiner

FIG. 7A  FIG. 7B

| | Case 1 |
|---|---|
| Mode 0 Vertical | Disuse |
| Mode 1 Horizontal | PRED[0,0]=PRED[0,1]=PRED[0,2]=PRED[0,3]=I<br>PRED[1,0]=PRED[1,1]=PRED[1,2]=PRED[1,3]=J<br>PRED[2,0]=PRED[2,1]=PRED[2,2]=PRED[2,3]=K<br>PRED[3,0]=PRED[3,1]=PRED[3,2]=PRED[3,3]=L |
| Mode 2 DC | PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]=(I+J+K+L+2)/4 |
| Mode 3 Diagonal down left | PRED[0,0]=(I+2*J+K+2)/4  PRED[0,1]=PRED[1,0]=(J+2*K+L+2)/4<br>PRED[0,2]=PRED[1,1]=PRED[2,0]=(K+L+1)/2<br>PRED[0,3]=PRED[1,2]=PRED[2,1]=PRED[3,0]=(K+3*L+2)/4<br>PRED[1,3]=PRED[2,2]=PRED[3,1]=<br>PRED[2,3]=PRED[3,2]=PRED[3,3]=(K+3*L+2)/4 |
| Mode 4 Diagonal down right | PRED[1,0]=PRED[2,1]=PRED[3,2]=(J+3*I+2)/4<br>PRED[2,0]=PRED[3,1]=(K+2*J+I+2)/4<br>PRED[3,0]=(J+2*K+L+2)/4<br>PRED[0,0]=PRED[1,1]=PRED[2,2]=PRED[3,3]=<br>PRED[0,1]=PRED[1,2]=PRED[2,3]=PRED[0,2]=PRED[1,3]=(3*I+J+2)/4 |

Continue from FIG. 9A

| Mode | Case: 1(Left) | Equations |
|---|---|---|
| Mode 5 Vertical Right | (diagram) | PRED[1,0]=PRED[3,1]=(3*I+J+2)/4<br>PRED[2,0]=(X+2*I+J+2)/4  PRED[3,0]=(I+2*J+K+2)/4<br>PRED[0,0]=PRED[2,1]=PRED[0,2]=PRED[2,3]=<br>PRED[1,1]=PRED[1,2]=PRED[3,2]=(X+2*A+B+2)/4 |
| Mode 6 Horizontal down | (diagram) | PRED[0,0]=PRED[1,2]=(3*I+J+2)/4  PRED[1,0]=PRED[2,2]=(I+J+1)/2<br>PRED[2,0]=PRED[3,2]=(J+K+1)/2  PRED[2,1]=PRED[3,3]=(I+2*J+K+2)/4<br>PRED[1,1]=PRED[1,3]=(3*I+J+2)/4  PRED[1,1]=PRED[2,3]=(X+2*I+J+2)/4<br>PRED[0,2]=(3*I+J+2)/4  PRED[0,3]=(3*I+J+2)/4<br>PRED[3,0]=(K+L+1)/2  PRED[3,1]=(J+2*K+L+2)/4 |
| Mode 7 Vertical left | (diagram) | PRED[0,1]=PRED[2,0]=PRED[0,2]=PRED[2,1]=PRED[0,3]=PRED[2,2]=<br>(K+L+1)/2<br>PRED[1,1]=PRED[3,0]=PRED[1,2]=PRED[3,1]=PRED[1,3]=PRED[3,2]=<br>(K+3*L+2)/4<br>PRED[0,0]=(J+2*K+L+2)/4  PRED[2,3]=(K+3*L+2)/4<br>PRED[1,0]=(I+2*J+K+2)/4  PRED[3,3]=(K+3*L+2)/4 |
| Mode 8 Horizontal Up | Case: 1(Left): Same Convention (diagram) | PRED[0,0]=(I+J+1)/2  PRED[0,1]=(I+2*J+K+2)/4<br>PRED[0,2]=PRED[1,0]=(J+K+1)/2  PRED[0,3]=PRED[1,1]=(J+2*K+L+2)/4<br>PRED[1,2]=PRED[2,0]=(K+L+1)/2  PRED[1,3]=PRED[2,1]=(K+2*L+L+2)/4<br>PRED[3,0]=PRED[2,2]=PRED[2,3]=PRED[3,1]=PRED[3,2]=PRED[3,3]=L; |

Continue from FIG. 10A

| | | |
|---|---|---|
| Mode 5 Vertical Right | Case: 2(Up) | PRED[0,0]=PRED[2,1]=(3*A+B+2)/4 PRED[0,1]=PRED[2,2]=(A+B+1)/2<br>PRED[0,2]=PRED[2,3]=(B+C+1)/2 PRED[1,0]=PRED[3,1]=(3*A+B+2)/4<br>PRED[1,1]=PRED[3,2]=(3*A+B+2)/4 PRED[1,2]=PRED[3,3]=(A+2*B+C+2)/4<br>PRED[0,3]=(C+D+1)/2 PRED[1,3]=(B+2*C+D+2)/4<br>PRED[2,0]=(3*A+B+2)/4 PRED[3,0]=(3*A+B+2)/4 |
| Mode 6 Horizontal down | Case: 2(Up) | PRED[0,0]=PRED[1,2]=(3*A+B+2)/4 PRED[0,1]=PRED[1,3]=(A+B+1)/2<br>PRED[0,2]=(3*A+B+2)/4 PRED[0,3]=(A+2*B+C+2)/4<br>PRED[2,0]=PRED[3,2]=PRED[2,1]=PRED[3,3]=PRED[3,0]=PRED[2,2]=PRED[2,3] =PRED[1,0]=PRED[1,1]=(3*I+J+2)/4 |
| Mode 7 Vertical left | Case: 2(Up) | PRED[0,1]=PRED[2,0]=(B+C+1)/2 PRED[0,2]=PRED[2,1]=(C+D+1)/2<br>PRED[0,3]=PRED[2,2]=(D+E+1)/2<br>PRED[1,1]=PRED[3,0]=(B+2*C+D+2)/4 PRED[1,2]=PRED[3,1]=(C+3*D+2)/4<br>PRED[1,3]=PRED[3,2]=(C+3*D+2)/4<br>PRED[0,0]=(A+B+1)/2 PRED[2,3]=(C+3*D+2)/4<br>PRED[1,0]=(A+2*B+C+2)/4 PRED[3,3]=(C+3*D+2)/4 |
| Mode 8 Horizontal Up | Case: 2(Up) | PRED[0,0]=PRED[1,1]=(B+2*C+D+2)/4<br>PRED[0,2]=PRED[1,0]=(C+D+1)/2 PRED[0,3]=PRED[1,1]=(C+3*D+2)/4<br>PRED[1,2]=PRED[2,0]=(C+3*D+2)/4 PRED[1,3]=PRED[2,1]=(C+3*D+2)/4<br>PRED[3,0]=PRED[2,2]=PRED[2,3]=PRED[3,1]=PRED[3,2]=PRED[3,3]=(C+3*D+2)/4 |

FIG. 10B

| | Case 3 | |
|---|---|---|
| Mode 0 Vertical | Case: 3(Down)<br>X A B C D E F G H<br>I 0,0 0,1 0,2 0,3 M<br>J 1,0 1,1 1,2 1,3 N<br>K 2,0 2,1 2,2 2,3 O<br>L 3,0 3,1 3,2 3,3 P<br>V Q R S T W | PRED[0,0]=PRED[1,0]=PRED[2,0]=PRED[3,0]=Q<br>PRED[0,1]=PRED[1,1]=PRED[2,1]=PRED[3,1]=R<br>PRED[0,2]=PRED[1,2]=PRED[2,2]=PRED[3,2]=S<br>PRED[0,3]=PRED[1,3]=PRED[2,3]=PRED[3,3]=T |
| Mode 1 Horizontal | Case: 3(Down):Not use<br>X A B C D E F G H<br>I 0,0 0,1 0,2 0,3 M<br>J 1,0 1,1 1,2 1,3 N<br>K 2,0 2,1 2,2 2,3 O<br>L 3,0 3,1 3,2 3,3 P<br>V Q R S T W | Disuse |
| Mode 2 DC | Case: 3(Down)<br>X A B C D E F G H<br>I 0,0 0,1 0,2 0,3 M<br>J 1,0 1,1 1,2 1,3 N<br>K 2,0 2,1 2,2 2,3 O<br>L 3,0 3,1 3,2 3,3 P<br>V Q R S T W | PRED[0,0]=PRED[1,0]=PRED[2,0]=PRED[3,0]=<br>PRED[0,1]=PRED[1,1]=PRED[2,1]=PRED[3,1]=<br>PRED[0,2]=PRED[1,2]=PRED[2,2]=PRED[3,2]=<br>PRED[0,3]=PRED[1,3]=PRED[2,3]=PRED[3,3]=(Q+R+S+T+2)/4 |
| Mode 3 Diagonal down left | Case: 3(Bottom)<br>X A B C D E F G H<br>I 0,0 0,1 0,2 0,3 M<br>J 1,0 1,1 1,2 1,3 N<br>K 2,0 2,1 2,2 2,3 O<br>L 3,0 3,1 3,2 3,3 P<br>V Q R S T W | PRED[1,0]=PRED[2,1]=PRED[3,2]=(S+3*T+2)/4<br>PRED[2,0]=PRED[3,1]=(R+2*S+T+2)/4<br>PRED[3,0]=(Q+2*R+S+2)/4<br>PRED[0,0]=PRED[1,1]=PRED[2,2]=PRED[3,3]=<br>PRED[0,1]=PRED[1,2]=PRED[2,3]=PRED[0,2]=PRED[1,3]=PRED[0,3]=(S+3*T+2)/4 |
| Mode 4 Diagonal down right | Case: 3(Bottom)<br>X A B C D E F G H<br>I 0,0 0,1 0,2 0,3 M<br>J 1,0 1,1 1,2 1,3 N<br>K 2,0 2,1 2,2 2,3 O<br>L 3,0 3,1 3,2 3,3 P<br>V Q R S T W | PRED[1,0]=PRED[2,1]=PRED[3,2]=(S+3*T+2)/4<br>PRED[2,0]=PRED[3,1]=(R+2*S+T+2)/4<br>PRED[3,0]=(Q+2*R+S+2)/4<br>PRED[0,0]=PRED[1,1]=PRED[2,2]=PRED[3,3]=<br>PRED[0,1]=PRED[1,2]=PRED[2,3]=PRED[0,2]=PRED[1,3]=PRED[0,3]=(S+3*T+2)/4 |

Continue from FIG. 11A

| Mode | | |
|---|---|---|
| Mode 5 Vertical Right | Case: 3(Down) [tables of pixel grids] | PRED[1,0]=PRED[3,1]=(Q+2*R+S+2)/4 PRED[1,1]=PRED[3,2]=(R+2*S+T+2)/4 PRED[1,2]=PRED[3,3]=(S+3*T+2)/4 PRED[0,3]=(C+D+1)/2 PRED[1,3]=(S+3*T+2)/4 PRED[2,0]=(3*A+B+2)/4 PRED[3,0]=(Q+2*R+S+2)/4 PRED[2,1]=(R+2*S+T+2)/4 PRED[0,1]=PRED[2,2]=(S+3*T+2)/4 PRED[0,2]=PRED[2,3]=(S+3*T+2)/4 |
| Mode 6 Horizontal down | Case: 3(Bottom) [tables] | PRED[2,1]=PRED[3,3]=(S+3*T+2)/4 PRED[2,0]=PRED[3,2]=(S+T+1)/2 PRED[3,1]=(R+2*S+T+2)/4 PRED[3,0]=(Q+2*R+S+2)/4 PRED[0,0]=PRED[1,2]=PRED[2,3]=(S+3*T+2)/4 PRED[1,1]=PRED[0,2]=PRED[1,3]=(S+3*T+2)/4 |
| Mode 7 Vertical left | Case: 3(Bottom) [tables] | PRED[1,1]=PRED[3,0]=(3*Q+R+2)/4 PRED[1,2]=PRED[3,1]=Q+R+1)/2 PRED[1,3]=PRED[3,2]=(Q+2*R+S+2)/4 PRED[0,1]=PRED[2,0]=(3*Q+R+2)/4 PRED[0,2]=PRED[2,1]=(3*Q+R+2)/4 PRED[0,3]=PRED[2,2]=(Q+2*R+S+2)/4 PRED[0,0]=(3*Q+R+2)/4 PRED[2,3]=(R+2*S+T+2)/4 PRED[1,0]=(3*Q+R+2)/4 PRED[3,3]=(S+3*T+2)/4 |
| Mode 8 Horizontal Up | Case: 3(Bottom) [tables] | PRED[3,0]=PRED[2,2]=(3*Q+R+2)/4 PRED[2,3]=PRED[3,1]=(Q+R+1)/2 PRED[0,0]=PRED[1,1]=PRED[0,2]=PRED[1,0]=PRED[0,3]=PRED[1,1]= PRED[1,2]=PRED[2,0]=(3*Q+R+2)/4 PRED[2,1]=PRED[0,3]=(3*Q+R+2)/4 PRED[3,2]=(Q+2*R+S+2)/4 PRED[3,3]=(R+2*S+T+2)/4; |

FIG. 11B

| | Case 4 | |
|---|---|---|
| Mode 0 Vertical | Case: 4(Right):Not use<br>X A B C D E F G H<br>I 0,0 1,0 2,0 3,0 M<br>J 0,1 1,1 2,1 3,1 N<br>K 0,2 1,2 2,2 3,2 O<br>L 0,3 1,3 2,3 3,3 P<br>V Q R S T W | Disuse |
| Mode 1 Horizontal | Case: 4(Right)<br>X A B C D E F G H<br>I M<br>J N<br>K O<br>L P<br>V Q R S T W | PRED[0,0]=PRED[0,1]=PRED[0,2]=PRED[0,3]=M<br>PRED[1,0]=PRED[1,1]=PRED[1,2]=PRED[1,3]=N<br>PRED[2,0]=PRED[2,1]=PRED[2,2]=PRED[2,3]=O<br>PRED[3,0]=PRED[3,1]=PRED[3,2]=PRED[3,3]=P |
| Mode 2 DC | Case: 4(Right)<br>X A B C D E F G H<br>I M<br>J N<br>K O<br>L P<br>V Q R S T W | PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]=(M+N+O+P+2)/4 |
| Mode 3 Diagonal down left | Case: 4(Right) X A B C D E F G H<br>I M<br>J N<br>K O<br>L P<br>V Q R S T W | PRED[1,3]=PRED[2,2]=PRED[3,1]=(M+N+1)/2  PRED[2,3]=PRED[3,2]=(M+2*N+O+2)/4<br>PRED[3,3]=<br>PRED[0,3]=PRED[1,2]=PRED[2,1]=PRED[3,0]=(3*M+N+2)/4<br>PRED[0,0]=PRED[0,1]=PRED[1,0]=PRED[0,2]=PRED[1,1]=PRED[2,0]=PRED[0,3]=PRED[1,2]=<br>PRED[2,1]=PRED[3,0]=(3*M+N+2)/4 |
| Mode 4 Diagonal down right | Case: 4(Right) X A B C D E F G H<br>I M<br>J N<br>K O<br>L P<br>V Q R S T W | PRED[0,1]=PRED[1,2]=PRED[2,3]=(3*P+O+2)/4  PRED[ 0,2]=PRED[1,3]=(N+2*O+P+2)/4<br>PRED[0,3]=(O+2N+M+2)/4<br>PRED[0,0]=PRED[1,1]=PRED[2,2]=PRED[3, 3]=<br>PRED[1,0]=PRED[2,1]=PRED[3,2]=<br>PRED[2,0]=PRED[3,1]=PRED[3,0]=(Q+2*R+S+2)/4 |

| | Case 5 |
|---|---|
| Mode 0 Vertical | PRED[0,0]=PRED[1,0]=PRED[2,0]=PRED[3,0]=A<br>PRED[0,1]=PRED[1,1]=PRED[2,1]=PRED[3,1]=B<br>PRED[0,2]=PRED[1,2]=PRED[2,2]=PRED[3,2]=C<br>PRED[0,3]=PRED[1,3]=PRED[2,3]=PRED[3,3]=D |
| Mode 1 Horizontal | PRED[0,0]=PRED[0,1]=PRED[0,2]=PRED[0,3]=I<br>PRED[1,0]=PRED[1,1]=PRED[1,2]=PRED[1,3]=J<br>PRED[2,0]=PRED[2,1]=PRED[2,2]=PRED[2,3]=K<br>PRED[3,0]=PRED[3,1]=PRED[3,2]=PRED[3,3]=L |
| Mode 2 DC | PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]=(A+B+C+D+I+J+K+L+4)/8 |
| Mode 3 Diagonal down left | PRED[0,0]=(A+2*B+C+2)/4    PRED[0,1]=PRED[1,0]=(B+D+2*C+2)/4<br>PRED[0,2]=PRED[1,1]=PRED[2,0]=(C+D+1)/2<br>PRED[0,3]=PRED[1,2]=PRED[2,1]=PRED[3,0]=(C+3*D+2)/4<br>PRED[1,3]=PRED[2,2]=PRED[3,1]=(C+3*D+2)/4<br>PRED[2,3]=PRED[3,2]=PRED[3,3]=(C+3*D+2)/4 |
| Mode 4 Diagonal down right | PRED[0,1]=PRED[1,2]=PRED[2,3]=(X+2*A+B+2)/4   PRED[1,3]=(A+2*B+C+2)/4;<br>PRED[0,2]=PRED[0,3]=(B+2*C+D+2)/4  PRED[2,2]=PRED[3,3]=(I+2*X+A+2)/4<br>PRED[0,0]=PRED[1,1]=PRED[2,2]=PRED[3,3]=(X+2*I+J+2)/4<br>PRED[1,0]=PRED[2,1]=PRED[3,2]=(J+2*I+X+2)/4<br>PRED[2,0]=PRED[3,1]=(K+2*J+I+2)/4<br>PRED[3,0]=(J+2*K+L+2)/4 |

Continue from FIG. 13A

| | |
|---|---|
| Mode 5 Vertical Right | Case: 5(Up and Left) : Same Convention<br>PRED[0,0]=PRED[2,1]=(X+A+1)/2  PRED[0,1]=PRED[2,2]=(A+B+1)/2<br>PRED[0,2]=PRED[2,3]=(B+C+1)/2  PRED[1,0]=PRED[3,1]=(I+2*X+A+2)/4<br>PRED[1,1]=PRED[3,2]=(X+2*A+B+2)/4  PRED[1,2]=PRED[3,3]=(A+2*B+C+2)/4<br>PRED[0,3]=(C+D+1)/2  PRED[1,3]=(B+2*C+D+2)/4<br>PRED[2,0]=(X+2*I+J+2)/4  PRED[3,0]=(I+2*J+K+2)/4 |
| Mode 6 Horizontal down | Case: 5(Up and Left) : Same Convention<br>PRED[0,0]=PRED[1,2]=(X+I+1)/2  PRED[0,1]=PRED[1,3]=(I+2*X+A+2)/4<br>PRED[0,2]=PRED[2,2]=(I+J+1)/2  PRED[1,1]=PRED[2,3]=(X+2*I+J+2)/4<br>PRED[2,0]=PRED[3,2]=(J+K+1)/2  PRED[2,1]=PRED[3,3]=(I+2*J+K+2)/4<br>PRED[0,3]=(A+2*B+C+2)/4<br>PRED[3,1]=(J+2*K+L+2)/4  PRED[3,0]=(K+L+1)/2 |
| Mode 7 Vertical left | Case: 5(Up and Left) : Same Convention<br>PRED[0,0]=(A+B+1)/2  PRED[0,1]=PRED[2,0]=(B+C+1)/2  PRED[0,2]=PRED[2,1]=(C+D+1)/2<br>PRED[0,3]=PRED[2,2]=(D+E+1)/2  PRED[1,1]=PRED[3,0]=(B+2*C+D+2)/4<br>PRED[1,2]=PRED[3,1]=(C+2*D+E+2)/4  PRED[1,3]=PRED[3,2]=(D+2*E+F+2)/4<br>PRED[1,0]=(A+2*B+C+2)/4<br>PRED[2,3]=(E+F+1)/2  PRED[3,3]=(E+2*F+G+2)/4 |
| Mode 8 Horizontal Up | PRED[0,0]=(I+J+1)/2  PRED[0,1]=(I+2*J+K+2)/4<br>PRED[0,2]=PRED[1,0]=(J+K+1)/2  PRED[1,1]=(J+2*K+L+2)/4<br>PRED[0,3]=PRED[1,2]=(K+L+1)/2<br>PRED[1,3]=PRED[2,1]=(K+2*L+L+2)/4<br>PRED[3,0]=PRED[2,2]=PRED[2,3]=PRED[3,1]=PRED[3,2]=PRED[3,3]=L; |

FIG. 13B

| Case 6 | |
|---|---|
| Mode 0 Vertical | PRED[0,0]=PRED[1,0]=PRED[2,0]=PRED[3,0]=A<br>PRED[0,1]=PRED[1,1]=PRED[2,1]=PRED[3,1]=B<br>PRED[0,2]=PRED[1,2]=PRED[2,2]=PRED[3,2]=C<br>PRED[0,3]=PRED[1,3]=PRED[2,3]=PRED[3,3]=D |
| Mode 1 Horizontal | PRED[0,0]=PRED[0,1]=PRED[0,2]=PRED[0,3]=M<br>PRED[1,0]=PRED[1,1]=PRED[1,2]=PRED[1,3]=N<br>PRED[2,0]=PRED[2,1]=PRED[2,2]=PRED[2,3]=O<br>PRED[3,0]=PRED[3,1]=PRED[3,2]=PRED[3,3]=P |
| Mode 2 DC | PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]=(A+B+C+D+ M+N+O+P+4)/8 |
| Mode 3 Diagonal down left | PRED[0,0]=(A+2*B+C+2)/4    PRED[0,1]=PRED[1,0]=(B+D+2*C+2)/4<br>PRED[0,2]=PRED[1,1]=PRED[2,0]=(C+E+2*D+2)/4<br>PRED[1,3]=PRED[2,2]=PRED[3,1]=(3*M+N+2)/4  PRED[2,3]=PRED[3,2]=(M+2*N+O+2)/4  PRED[3,3]=(N+2*O+P+2)/4<br>PRED[0,3]=PRED[1,2]=PRED[2,1]=PRED[3,0]=(D+M+2*E+2)/4 |
| Mode 4 Diagonal down right | PRED[0,1]=PRED[1,2]=PRED[2,3]=(3*A+B+2)/4<br>PRED[0,2]=PRED[1,3]=(B+2*C+D+2)/4;  PRED[0,3]=(C+3*D)/4<br>PRED[0,0]=PRED[1,1]=PRED[2,2]=PRED[3,3]=<br>PRED[1,0]=PRED[2,1]=PRED[3,2]=PRED[2,0]=PRED[3,1]=PRED[3,0]=(3*A+B+2)/4 |

Continue from FIG. 14A

| Mode | Case: 6(Up and Right) | Predictions |
|---|---|---|
| Mode 5 Vertical Right | (diagram) | PRED[0,0]=PRED[2,1]=(3*A+B+2)/4  PRED[0,1]=PRED[2,2]=(A+B+1)/2<br>PRED[0,2]=PRED[2,3]=(B+C+1)/2  PRED[1,0]=PRED[3,1]=(3*A+B+2)/4<br>PRED[1,1]=PRED[3,2]=(3*A+B+2)/4  PRED[1,2]=PRED[3,3]=(A+2*B+C+2)/4<br>PRED[0,3]=(C+D+1)/2  PRED[1,3]=(B+2*C+D+2)/4<br>PRED[2,0]=(3*A+B+2)/4  PRED[3,0]=(3*A+B+2)/4 |
| Mode 6 Horizontal down | (diagram) | PRED[0,0]=PRED[1,2]=(3*A+B+2)/4  PRED[0,1]=PRED[1,3]=(A+B+1)/2<br>PRED[0,2]=(3*A+B+2)/4  PRED[0,3]=(A+2*B+C+2)/4<br>PRED[1,0]=PRED[2,2]=(3*P+O+2)/4  PRED[1,1]=(A+B+1)/2<br>PRED[2,0]=(M+2*N+O+2)/4  PRED[2,1]=PRED[3,3]=PRED[3,0]=(3*P+O+2)/4<br>PRED[0,2]=(M+N+1)/2  PRED[3,2]=PRED[2,1]=PRED[3,3]=(3*P+O+2)/4 |
| Mode 7 Vertical left | (diagram) | PRED[0,1]=PRED[2,0]=(B+C+1)/2  PRED[0,2]=PRED[2,1]=(C+D+1)/2<br>PRED[0,3]=PRED[2,2]=(D+E+1)/2  PRED[1,2]=PRED[3,1]=(C+3*D+2)/4<br>PRED[1,1]=PRED[3,0]=(B+2*C+D+2)/4  PRED[1,3]=PRED[3,2]=(C+3*D+2)/4<br>PRED[1,3]=PRED[3,2]=(C+3*D+2)/4<br>PRED[0,0]=(A+B+1)/2  PRED[2,3]=(M+2*N+O+2)/4<br>PRED[1,0]=(A+2*B+C+2)/4  PRED[3,3]=(N+2*O+P+2)/4 |
| Mode 8 Horizontal Up | (diagram) | PRED[0,0]=(B+C+1)/2  PRED[0,1]=(B+2*C+D+2)/4<br>PRED[0,2]=PRED[1,0]=(C+D+1)/2  PRED[0,3]=PRED[1,1]=(C+3*D+2)/4<br>PRED[1,2]=PRED[2,0]=(3*M+N+2)/4  PRED[2,1]=PRED[1,3]=(M+N+1)/2<br>PRED[3,0]=PRED[2,2]=(M+2*N+O+2)/4  PRED[2,3]=PRED[3,1]=(N+O+1)/2<br>PRED[3,2]=(N+2*O+P+2)/4  PRED[3,3]=(O+P+1)/2 |

FIG. 14B

| | Case 7 |
|---|---|
| Mode 0 Vertical | Case: 7(Down and Left) [diagram]<br>PRED[0,0]=PRED[1,0]=PRED[2,0]=PRED[3,0]= Q<br>PRED[0,1]=PRED[1,1]=PRED[2,1]=PRED[3,1]= R<br>PRED[0,2]=PRED[1,2]=PRED[2,2]=PRED[3,2]= S<br>PRED[0,3]=PRED[1,3]=PRED[2,3]=PRED[3,3]= T |
| Mode 1 Horizontal | Case: 7(Down and Left) [diagram]<br>PRED[0,0]=PRED[0,1]=PRED[0,2]=PRED[0,3]= I<br>PRED[1,0]=PRED[1,1]=PRED[1,2]=PRED[1,3]= J<br>PRED[2,0]=PRED[2,1]=PRED[2,2]=PRED[2,3]= K<br>PRED[3,0]=PRED[3,1]=PRED[3,2]=PRED[3,3]= L |
| Mode 2 DC | Case: 7(Down and Left) [diagram]<br>PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]=( Q+R+S+T+I+J+K+L+4)/8 |
| Mode 3 Diagonal down left | Case: 7(Bottom and Left) [diagram] [diagram]<br>PRED[0,0]=(A+2\*B+C+2)/4  PRED[0,1]=PRED[1,0]=(B+D+2\*C+2)/4<br>PRED[0,2]=PRED[1,1]=PRED[2,0]=(C+E+2\*D+2)/4<br>PRED[1,3]=PRED[2,2]=PRED[3,1]=(3\*M+N+2)/4  PRED[2,3]=PRED[3,2]=(M+2\*N+O+2)/4  PRED[3,3]=(N+2\*O+P+2)/4<br>PRED[0,3]=PRED[1,2]=PRED[2,1]=PRED[3,0]=(D+M+2\*E+2)/4 |
| Mode 4 Diagonal down right | Case: 7(Bottom and Left) [diagram] [diagram]<br>PRED[1,0]=PRED[2,1]=PRED[3,2]=(J+3\*I+2)/4<br>PRED[2,0]=PRED[3,1]=(K+2\*J+I+2)/4<br>PRED[3,0]=(J+2\*K+L+2)/4<br>PRED[0,0]=PRED[1,1]=PRED[2,2]=PRED[3,3]=<br>PRED[1,0]=PRED[2,1]=PRED[3,2]=PRED[2,0]=PRED[3,1]=PRED[3,0]=(J+3\*I+2)/4 |

Continue from FIG. 15A

| | | |
|---|---|---|
| Mode 5 Vertical Right | Case: 8(Down and Left) [grid image] | PRED[0,0]=PRED[2,1]=(3*I+J+2)/4   PRED[1,0]=PRED[3,1]=(3*I+J+2)/4<br>PRED[2,0]=(I+2*J+K+2)/4   PRED[3,0]=(J+2*K+L+2)/4<br>PRED[1,1]=PRED[3,2]=(R+2*S+T+2)/4   PRED[1,2]=PRED[3,3]=(S+3*T+2)/4<br>PRED[0,1]=PRED[2,2]=(S+3*T+2)/4   PRED[0,2]=PRED[2,3]=(S+3*T+2)/4 |
| Mode 6 Horizontal down | Case: 8(Bottom and Left) [grid image] | PRED[0,0]=PRED[1,2]=(3*I+J+2)/4   PRED[1,0]=PRED[2,2]=(I+J+1)/2<br>PRED[2,0]=PRED[3,2]=(J+K+1)/2   PRED[2,1]=PRED[3,3]=(I+2*J+K+2)/4<br>PRED[1,1]=PRED[2,3]=(3*I+J+2)/4   PRED[0,3]=(3*I+J+2)/4<br>PRED[3,0]=(K+L+1)/2   PRED[3,1]=(J+2*K+L+2)/4 |
| Mode 7 Vertical left | Case: 8(Bottom and Left) [grid image] | PRED[1,1]=PRED[3,0]=(L+2*V+Q+2)/4   PRED[1,2]=PRED[3,1]=(V+2*Q+R+2)/4<br>PRED[1,3]=PRED[3,2]=(Q+2*R+S+2)/4<br>PRED[0,1]=PRED[2,0]=(K+2*L+V+2)/4   PRED[0,2]=PRED[2,1]=(V+Q+1)/2<br>PRED[0,3]=PRED[2,2]=(Q+R+1)/2<br>PRED[0,0]=(I+2*J+K+2)/4   PRED[2,3]=(R+2*S+T+2)/4<br>PRED[1,0]=(J+2*K+L+2)/4   PRED[3,3]=(S+3*T+2)/4 |
| Mode 8 Horizontal Up | Case: 8(Bottom and Left) [grid image] | PRED[0,0]=(I+J+1)/2   PRED[0,1]=(I+2*J+K+2)/4<br>PRED[0,2]=PRED[1,0]=(J+K+1)/2   PRED[0,3]=PRED[1,1]=(J+2*K+L+2)/4<br>PRED[1,2]=PRED[2,0]=(K+L+1)/2   PRED[2,1]=PRED[1,3]=(K+2*L+V+2)/4<br>PRED[3,0]=PRED[2,2]=(3*Q+R+2)/4   PRED[2,3]=PRED[3,1]=(Q+R+1)/2<br>PRED[3,2]=(Q+2*R+S+2)/4   PRED[3,3]=(R+2*S+T+2)/4; |

*FIG. 15B*

| | Case 8 |
|---|---|
| Mode 0 Vertical | Case: 8(Down and Right)<br>PRED[0,0]=PRED[1,0]=PRED[2,0]=PRED[3,0]=Q<br>PRED[0,1]=PRED[1,1]=PRED[2,1]=PRED[3,1]=R<br>PRED[0,2]=PRED[1,2]=PRED[2,2]=PRED[3,2]=S<br>PRED[0,3]=PRED[1,3]=PRED[2,3]=PRED[3,3]=T |
| Mode 1 Horizontal | Case: 8(Down and Right)<br>PRED[0,0]=PRED[0,1]=PRED[0,2]=PRED[0,3]=M<br>PRED[1,0]=PRED[1,1]=PRED[1,2]=PRED[1,3]=N<br>PRED[2,0]=PRED[2,1]=PRED[2,2]=PRED[2,3]=O<br>PRED[3,0]=PRED[3,1]=PRED[3,2]=PRED[3,3]=P |
| Mode 2 DC | Case: 8(Down and Right)<br>PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]=(Q+R+S+T+M+N+O+P+4)/8 |
| Mode 3 Diagonal down left | Case: 8(Bottom and Right)<br>PRED[1,3]=PRED[2,2]=PRED[3,1]=(3*M+N+2)/4<br>PRED[2,3]=PRED[3,2]=(M+2*N+O+2)/4<br>PRED[3,3]=(N+2*O+P+2)/4<br>PRED[0,3]=PRED[1,2]=PRED[2,1]=PRED[3,0]=(3*M+N+2)/4<br>PRED[0,0]=PRED[1,1]=PRED[1,0]=PRED[0,2]=PRED[1,1]=PRED[2,0]=PRED[0,3]=PRED[1,2]=<br>PRED[2,1]=PRED[3,0]=(3*M+N+2)/4 |
| Mode 4 Diagonal down right | Case: 8(Bottom and Right)<br>PRED[0,1]=PRED[1,2]=PRED[2,3]=(3*P+O+2)/4<br>PRED[0,2]=PRED[1,3]=(N+2*O+P+2)/4 PRED[0,3]=(O+2*N+M+2)/4<br>PRED[0,0]=PRED[1,1]=PRED[2,2]=PRED[3,3]=(P+2*W+T+2)/4<br>PRED[1,0]=PRED[2,1]=PRED[3,2]=(S+3*T+2)/4<br>PRED[2,0]=PRED[3,1]=(R+2*S+T+2)/4<br>PRED[3,0]=(Q+2*R+S+2)/4 |

Continue from FIG. 16A

| Mode | | |
|---|---|---|
| Mode 5 Vertical Right | Case: 8 (Down and Right) | PRED[1,0]=PRED[3,1]=(Q+2*R+S+2)/4  PRED[1,1]=PRED[3,2]=(R+2*S+T+2)/4<br>PRED[1,2]=PRED[3,3]=(T+2*W+P+2)/4<br>PRED[0,3]=(M+N+1)/2  PRED[1,3]=(N+2*O+P+2)/4<br>PRED[2,0]=(Q+R+2)/4  PRED[3,0]=(3*Q+R+2)/4<br>PRED[0,0]=PRED[2,1]=(R+2*S+T+2)/4  PRED[0,1]=PRED[2,2]=(S+2*T+W+2)/4  PRED[0,2]=PRED[2,3]=(O+2*P+W+2)/4 |
| Mode 6 Horizontal down | Case: 8 (Bottom and Right) | PRED[1,0]=PRED[2,2]=(3*P+O+2)/4  PRED[0,0]=PRED[1,2]=(N+2*O+P+2)/4<br>PRED[1,1]=PRED[2,3]=(P+O+2)/2  PRED[0,1]=PRED[1,3]=(N+O+1)/2<br>PRED[0,2]=(M+2*N+O+2)/4  PRED[0,3]=(M+N+1)/2<br>PRED[2,1]=PRED[3,3]=(S+3*T+2)/4<br>PRED[2,0]=PRED[3,2]=(S+T+1)/2  PRED[3,0]=(Q+2*R+S+2)/4<br>PRED[3,1]=(R+2*S+T+2)/4 |
| Mode 7 Vertical left | Case: 8 (Bottom and Left) | PRED[1,1]=PRED[3,0]=(3*Q+R+2)/4  PRED[1,2]=PRED[3,1]=(Q+R+1)/2<br>PRED[1,3]=PRED[3,2]=(Q+2*R+S+2)/4<br>PRED[0,1]=PRED[2,0]=(3*Q+R+2)/4  PRED[0,2]=PRED[2,1]=(3*Q+R+2)/4<br>PRED[0,3]=PRED[2,2]=(Q+2*R+S+2)/4<br>PRED[0,0]=(3*Q+R+2)/4  PRED[2,3]=(O+2*P+W+2)/4<br>PRED[1,0]=(3*Q+R+2)/4  PRED[3,3]=(P+2*W+T+2)/4 |
| Mode 8 Horizontal Up | Case: 8 (Bottom and Left) | PRED[0,0]=PRED[0,1]=PRED[0,2]=PRED[1,0]=PRED[0,3]=<br>PRED[1,1]=(3*M+N+2)/4<br>PRED[1,2]=PRED[2,0]=(3*M+N+2)/4  PRED[1,3]=PRED[2,1]=(M+N+1)/2<br>PRED[3,0]=PRED[2,2]=(M+2*N+O+2)/4  PRED[2,3]=PRED[3,1]=(N+O+1)/2<br>PRED[3,2]=(N+2*O+P+2)/4  PRED[3,3]=(O+P+1)/2 |

*FIG. 16B*

| | Case 9 | |
|---|---|---|
| Mode 0 Vertical | Case: 9(Up and Down) table with X A B C D E F G H / I,J,K,L,V rows | PRED[0,0]=PRED[1,0]= A    PRED[2,0]=PRED[3,0]= Q<br>PRED[0,1]=PRED[1,1]= B    PRED[2,1]=PRED[3,1]= R<br>PRED[0,2]=PRED[1,2]= C    PRED[2,2]=PRED[3,2]= S<br>PRED[0,3]=PRED[1,3]= D    PRED[2,3]=PRED[3,3]= T |
| Mode 1 Horizontal | Case: 9(Up and Down) | Disuse |
| Mode 2 DC | Case: 9(Up and Down) | PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]=(A+B+C+D+ Q+R+S+T+4)/8 |
| Mode 3 Diagonal down left | Case: 9(Up and Bottom) two tables | PRED[0,0]=(A+2B+C+2)/4   PRED[0,1]=PRED[1,0]=(B+D+2*C+2)/4<br>PRED[0,2]=PRED[1,1]=PRED[2,0]=(C+E+2*D+2)/4<br>PRED[1,3]=PRED[2,2]=PRED[3,1]=(3*Q+R+2)/4   PRED[2,3]=PRED[3,2]=(Q+2R+S+2)/4   PRED[3,3]=(R+2*S+T+2)/4<br>PRED[0,3]=PRED[1,2]=PRED[2,1]=PRED[3,0]=(D+3*E+2)/4 |
| Mode 4 Diagonal down right | Case: 9(Up and Bottom) two tables | PRED[0,1]=PRED[1,2]=PRED[2,3]=(3*A+B+2)/4<br>PRED[0,2]=PRED[1,3]=(A+2*B+C+2)/4; PRED[0,3]=(C+3*D+2)/4   PRED[0,0]=PRED[1,1]=PRED[2,2]=PRED[3,3]=(3*A+B+2)/4<br>PRED[1,0]=PRED[2,1]=PRED[3,2]=(S+3*T+2)/4<br>PRED[2,0]=PRED[3,1]=(R+2*S+T+2)/4<br>PRED[3,0]=(Q+2*R+S+2)/4 |

| | Case 10 |
|---|---|
| Mode 0 Vertical | Disuse |
| Mode 1 Horizontal | PRED[0,0]=PRED[0,1]=I   PRED[0,2]=PRED[0,3]=M<br>PRED[1,0]=PRED[1,1]=J   PRED[1,2]=PRED[1,3]=N<br>PRED[2,0]=PRED[2,1]=K   PRED[2,2]=PRED[2,3]=O<br>PRED[3,0]=PRED[3,1]=L   PRED[3,2]=PRED[3,3]=P |
| Mode 2 DC | PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]=(I+J+K+L+M+N+O+P+4)/8 |
| Mode 3 Diagonal down left | PRED[0,0]=(I+2*J+K+2)/4   PRED[0,1]=PRED[1,0]=(J+2*K+L+2)/4<br>PRED[0,2]=PRED[1,1]=PRED[2,0]=(K+L+1)/2<br>PRED[1,3]=PRED[2,2]=PRED[3,1]=(3*M+N+2)/4   PRED[2,3]=PRED[3,2]=(M+2*N+O+2)/4   PRED[3,3]=(N+2*O+P+2)/4<br>PRED[0,3]=PRED[1,2]=PRED[2,1]=PRED[3,0]=(3*M+N+2)/4 |
| Mode 4 Diagonal down right | PRED[1,0]=PRED[2,1]=PRED[3,2]=(J+3*I+2)/4<br>PRED[2,0]=PRED[3,1]=(K+2*J+I+2)/4<br>PRED[3,0]=(J+2*K+L+2)/4<br>PRED[0,1]=PRED[1,2]=PRED[2,3]=(3*P+O+2)/4<br>PRED[0,2]=PRED[1,3]=(N+2*O+P+2)/4   PRED[0,3]=(O+2*N+M+2)/4<br>PRED[0,0]=PRED[1,1]=PRED[2,2]=PRED[3,3]=(J+3*I+2)/4 |

| | Case 11 |
|---|---|
| Mode 0<br>Vertical | Case: 11(Up,Down and Left)<br>[diagram]<br>PRED[0,0]=PRED[1,0]=A  PRED[2,0]=PRED[3,0]=Q<br>PRED[0,1]=PRED[1,1]=B  PRED[2,1]=PRED[3,1]=R<br>PRED[0,2]=PRED[1,2]=C  PRED[2,2]=PRED[3,2]=S<br>PRED[0,3]=PRED[1,3]=D  PRED[2,3]=PRED[3,3]=T |
| Mode 1<br>Horizontal | Case: 11(Up,Down and Left)<br>[diagram]<br>PRED[0,0]=PRED[0,1]=PRED[0,2]=PRED[0,3]= I<br>PRED[1,0]=PRED[1,1]=PRED[1,2]=PRED[1,3]= J<br>PRED[2,0]=PRED[2,1]=PRED[2,2]=PRED[2,3]= K<br>PRED[3,0]=PRED[3,1]=PRED[3,2]=PRED[3,3]= L |
| Mode 2<br>DC | Case: 11(Up,Down and Left)<br>[diagram]<br>PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]=(A+B+C+D+I+J+K+L+Q+R+S+T+6)/12 |
| Mode 3<br>Diagonal<br>down left | Case: 11(Up,Bottom and Left)<br>[diagram] [diagram]<br>PRED[0,0]=(A+2*B+C+2)/4  PRED[0,1]=PRED[1,0]=(B+D+2*C+2)/4<br>PRED[0,2]=PRED[1,1]=PRED[2,0]=(C+D+1)/2<br>PRED[0,3]=PRED[1,2]=PRED[2,1]=PRED[3,0]=(L+Q+1)/2<br>PRED[1,3]=PRED[2,2]=PRED[3,1]=(3*Q+R+2)/4 PRED[2,3]=PRED[3,2]=(Q+2*R+S+2)/4<br>PRED[3,3]=(R+2*S+T+2)/4 |
| Mode 4<br>Diagonal<br>down right | Case: 11(Up,Bottom and Left) : Same Convention<br>[diagram] [diagram]<br>PRED[0,1]=PRED[1,2]=(PRED[2,3]=(X+2*A+B+2)/4<br>PRED[0,2]=PRED[1,3]=PRED[0,3]=(B+2*C+D+2)/4<br>PRED[1,3]=(A+2*B+C+2)/4;<br>PRED[0,0]=PRED[1,1]=PRED[2,2]=PRED[3,3]=(I+2*X+A+2)/4<br>PRED[1,0]=PRED[2,1]=PRED[3,2]=(J+2*I+X+2)/4<br>PRED[2,0]=PRED[3,1]=(K+2*J+I+2)/4<br>PRED[3,0]=(J+2*K+L+2)/4 |

Continue from FIG. 19A

| | | |
|---|---|---|
| Mode 5 Vertical Right | Case: 11(Up,Down and Left) : Same Convention | PRED[0,0]=PRED[2,1]=(X+A+1)/2  PRED[0,1]=PRED[2,2]=(A+B+1)/2<br>PRED[0,2]=PRED[2,3]=(B+C+1)/2<br>PRED[1,0]=PRED[3,1]=(I+2*X+A+2)/4<br>PRED[1,1]=PRED[3,2]=(X+2*A+B+2)/4<br>PRED[1,2]=PRED[3,3]=(A+2*B+C+2)/4<br>PRED[0,3]=(C+D+1)/2   PRED[1,3]=(B+2*C+D+2)/4<br>PRED[2,0]=(K+2*I+J+2)/4  PRED[3,0]=(I+2*J+K+2)/4 |
| Mode 6 Horizontal down | Case: 11(Up,Bottom and Left) : Same Convention | PRED[0,0]=PRED[1,2]=(X+I+1)/2   PRED[0,1]=PRED[1,3]=(I+2*X+A+2)/4<br>PRED[1,0]=PRED[2,2]=(I+J+1)/2   PRED[1,1]=PRED[2,3]=(X+2*I+J+2)/4<br>PRED[2,0]=PRED[3,2]=(J+K+1)/2   PRED[2,1]=PRED[3,3]=(I+2*J+K+2)/4<br>PRED[0,2]=(X+2*A+B+2)/4    PRED[0,3]=(A+2*B+C+2)/4<br>PRED[3,0]=(K+L+1)/2           PRED[3,1]=(J+2*K+L+2)/4 |
| Mode 7 Vertical left | Case: 11(Up,Bottom and Left) : Same Convention | PRED[0,0]=PRED[2,0]=(B+C+1)/2   PRED[0,2]=PRED[2,1]=(C+D+1)/2<br>PRED[0,1]=PRED[2,2]=(D+E+1)/2   PRED[1,1]=PRED[3,0]=(B+2*C+D+2)/4<br>PRED[1,2]=PRED[3,1]=(C+2*D+E+2)/4   PRED[1,3]=PRED[3,2]=(D+2*E+F+2)/4<br>PRED[0,0]=(A+B+1)/2              PRED[2,3]=(E+F+1)/2<br>PRED[1,0]=(A+2*B+C+2)/4          PRED[3,3]=(E+2*F+G+2)/4 |
| Mode 8 Horizontal Up | Case: 11(Up,Bottom and Left) | PRED[0,0]=(I+J+1)/2<br>PRED[0,2]=PRED[1,0]=(J+K+1)/2   PRED[0,1]=(I+2*J+K+2)/4<br>PRED[1,2]=PRED[2,0]=(K+L+1)/2   PRED[1,1]=PRED[3,0]=(J+2*K+L+2)/4<br>PRED[2,1]=PRED[3,0]=(K+2*L+L+2)/4<br>PRED[3,0]=PRED[3,0]=(3*Q+R+2)/4   PRED[2,3]=PRED[3,1]=(Q+R+1)/2<br>PRED[3,2]=(Q+2*R+S+2)/4         PRED[3,3]=(R+2*S+T+2)/4; |

FIG. 19B

Case 12

| Mode | Diagram | Predictions |
|---|---|---|
| Mode 0 Vertical | Case: 12 (Up, Down and Right) | PRED[0,0]=PRED[1,0]=PRED[2,0]=PRED[3,0]= Q<br>PRED[0,1]=PRED[1,1]=PRED[2,1]=PRED[3,1]= R<br>PRED[0,2]=PRED[1,2]=PRED[2,2]=PRED[3,2]= S<br>PRED[0,3]=PRED[1,3]=PRED[2,3]=PRED[3,3]= T |
| Mode 1 Horizontal | Case: 12 (Up, Down and Right) | PRED[0,0]=PRED[0,1]=PRED[0,2]=PRED[0,3]= M<br>PRED[1,0]=PRED[1,1]=PRED[1,2]=PRED[1,3]= N<br>PRED[2,0]=PRED[2,1]=PRED[2,2]=PRED[2,3]= O<br>PRED[3,0]=PRED[3,1]=PRED[3,2]=PRED[3,3]= P |
| Mode 2 DC | Case: 12 (Up, Down and Right) | PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]= (A+B+C+D+M+N+O+P+Q+R+S+T+6)/12 |
| Mode 3 Diagonal down left | Case: 12 (Up, Bottom and Right) | PRED[0,0]=(A+2B+C+2)/4   PRED[0,1]=PRED[1,0]=(B+D+2*C+2)/4<br>PRED[0,2]=PRED[1,1]=PRED[2,0]=(C+E+2*D+2)/4<br>PRED[1,3]=PRED[2,2]=PRED[3,1]=(3*M+N+2*N+2)/4  PRED[2,3]=PRED[3,2]=(M+2*N+O+2)/4<br>PRED[3,3]=(N+2*O+P+2)/4<br>PRED[0,3]=PRED[1,2]=PRED[2,1]=PRED[3,0]=(D+M+2*E+2)/4 |
| Mode 4 Diagonal down right | Case: 12 (Up, Bottom and Right) | PRED[0,1]= PRED[1,2]=PRED[2,3]=(3*A+B+2)/4<br>PRED[0,2]=PRED[0,3]=(B+2*C+D+2)/4<br>PRED[1,3]=(A+2*B+C+2)/4;<br>PRED[0,0]=PRED[1,1]=PRED[2,2]=PRED[3,3]=(3*A+B+2)/4<br>PRED[1,0]= PRED[2,1]=PRED[3,2]=(S+3*T+2)/4<br>PRED[2,0]= PRED[3,1]=(R+2*S+T+2)/4<br>PRED[3,0]=(Q+2*R+S+2)/4 |

Case 13

| Mode | Diagram and Predictions |
|---|---|
| Mode 0 Vertical | Case: 13(Up,Left and Right)<br>PRED[0,0]=PRED[1,0]=PRED[2,0]=PRED[3,0]= A<br>PRED[0,1]=PRED[1,1]=PRED[2,1]=PRED[3,1]= B<br>PRED[0,2]=PRED[1,2]=PRED[2,2]=PRED[3,2]= C<br>PRED[0,3]=PRED[1,3]=PRED[2,3]=PRED[3,3]= D |
| Mode 1 Horizontal | Case: 13(Up,Left and Right)<br>PRED[0,0]=PRED[0,1]=I   PRED[0,2]=PRED[0,3]=M<br>PRED[1,0]=PRED[1,1]=J   PRED[1,2]=PRED[1,3]=N<br>PRED[2,0]=PRED[2,1]=K   PRED[2,2]=PRED[2,3]=O<br>PRED[3,0]=PRED[3,1]=L   PRED[3,2]=PRED[3,3]=P |
| Mode 2 DC | Case: 13(Up,Left and Right)<br>PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]=(A+B+C+D+M+N+O+P+Q+R+S+T+6)/12 |
| Mode 3 Diagonal down left | Case: 13(Up,Left and Right) : Same Convention<br>PRED[0,0]=(A+2*B+C+2)/4   PRED[0,1]=PRED[1,0]=(B+D+2*C+2)/4<br>PRED[0,2]=PRED[1,1]=PRED[2,0]=(C+E+2*D+2)/4<br>PRED[1,3]=PRED[2,2]=PRED[3,1]=(3*M+N+2)/4   PRED[2,3]=PRED[3,2]=(M+2*N+O+2)/4   PRED[3,3]=(N+2*O+P+2)/4<br>PRED[0,3]=PRED[1,2]=PRED[2,1]=PRED[3,0]=(D+M+2*E+2)/4 |
| Mode 4 Diagonal down right | PRED[0,1]=PRED[1,2]=PRED[2,3]=(X+2*A+B+2)/4<br>PRED[0,2]=PRED[1,3]=(B+2*C+D+2)/4<br>PRED[1,3]=(A+2*B+C+2)/4;<br>PRED[0,0]=PRED[1,1]=PRED[2,2]=PRED[3,3]=(J+2*X+A+2)/4<br>PRED[1,0]= PRED[2,1]=PRED[3,2]=(J+2*I+X+2)/4<br>PRED[2,0]= PRED[3,1]=(K+2*J+I+2)/4<br>PRED[3,0]=(J+2*K+L+2)/4 |

Case 14

| Mode | Predictions |
|------|-------------|
| Mode 0 Vertical | PRED[0,0]=PRED[1,0]=PRED[2,0]=PRED[3,0]= Q<br>PRED[0,1]=PRED[1,1]=PRED[2,1]=PRED[3,1]= R<br>PRED[0,2]=PRED[1,2]=PRED[2,2]=PRED[3,2]= S<br>PRED[0,3]=PRED[1,2]=PRED[2,3]=PRED[3,3]= T |
| Mode 1 Horizontal | PRED[0,0]=PRED[0,1]=PRED[0,2]=PRED[0,3]= M<br>PRED[1,0]=PRED[1,1]=PRED[1,2]=PRED[1,3]= N<br>PRED[2,0]=PRED[2,1]=PRED[2,2]=PRED[2,3]= O<br>PRED[3,0]=PRED[3,1]=PRED[3,2]=PRED[3,3]= P |
| Mode 2 DC | PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]=(I+J+K+L+M+N+O+P+Q+R+S+T+6)/12 |
| Mode 3 Diagonal down left | PRED[0,0]=(I+2*J+K+2)/4    PRED[0,1]=PRED[1,0]=(J+2*K+L+2)/4<br>PRED[0,2]=PRED[1,1]=PRED[2,0]=(K+L+1)/2<br>PRED[0,3]=PRED[1,2]=PRED[2,1]=PRED[3,0]=(L+Q+1)/2<br>PRED[1,3]=PRED[2,2]=PRED[3,1]=(3*Q+R+2)/4  PRED[2,3]=PRED[3,2]=(Q+2*R+S+2)/4<br>PRED[3,3]=(R+2*S+T+2)/4 |
| Mode 4 Diagonal down right | PRED[1,0]=PRED[2,1]=PRED[3,2]=(J+3*I+2)/4<br>PRED[2,0]=PRED[3,1]=(K+2*J+I+2)/4<br>PRED[0,0]=PRED[1,1]=PRED[2,2]=PRED[3,3]=(J+3*I+2)/4<br>PRED[0,1]=PRED[1,2]=PRED[2,3]=(3*I+O+2)/4<br>PRED[0,2]=PRED[1,3]=(N+2*O+I+2)/4<br>PRED[0,3]=(O+2*N+M+2)/4 |

Continue from FIG. 22A

| | | |
|---|---|---|
| Mode 5 Vertical Right | Case: 14(Down,Left and Right) [diagrams with X A B C D E F G H rows] | PRED[0,0]=PRED[2,1]=(3*I+J+2)/4  PRED[1,0]=PRED[3,1]=(3*I+J+2)/4<br>PRED[2,0]=(I+2*J+K+2)/4  PRED[3,0]=(J+2*K+L+2)/4 |
| Mode 6 Horizontal down | Case: 14(Bottom,Left and Right) [diagrams] | PRED[0,0]=PRED[1,2]=(3*I+J+2)/4  PRED[1,0]=PRED[2,2]=(I+J+1)/2<br>PRED[2,0]=PRED[3,2]=(J+K+1)/2  PRED[2,1]=PRED[3,3]=(I+2*J+K+2)/4<br>PRED[1,1]=PRED[2,3]=(I+J+1)/2<br>PRED[0,1]=PRED[1,3]=(3*I+J+2)/4  PRED[2,3]=(X+2*I+J+2)/4<br>PRED[0,2]=(3*I+J+2)/4 |
| Mode 7 Vertical left | Case: 14(Bottom,Left and Right) [diagrams] | PRED[1,1]=PRED[3,0]=PRED[1,2]=PRED[1,3]=PRED[3,1]=PRED[1,3]=PRED[3,2]=<br>(K+3*L+2)/4  PRED[1,1]=PRED[3,0]=(3*Q+R+2)/4  PRED[1,2]=PRED<br>[3,1]=(Q+R+1)/2  PRED[1,3]=PRED[3,2]=(Q+2*R+S+2)/4<br>PRED[0,0]=(I+2*J+K+2)/4  PRED[1,0]=(J+2*K+L+2)/4<br>PRED[2,3]=(O+2*P+W+2)/4  PRED[3,3]=(P+2*W+T+2)/4 |
| Mode 8 Horizontal Up | Case: 14(Bottom,Left and Right) [diagrams] | PRED[0,0]=(I+J+1)/2  PRED[0,1]=(I+2*J+K+2)/4<br>PRED[0,2]=PRED[1,0]=(J+K+1)/2  PRED[0,3]=PRED[1,1]=(J+2*K+L+2)/4<br>PRED[1,2]=PRED[2,0]=(K+L+1)/2  PRED[2,1]=PRED[0,3]=(K+2*L+1+2)/4<br>PRED[3,0]=PRED[2,2]=(3*Q+R+2)/4  PRED[3,1]=(Q+R+1)/2<br>PRED[3,2]=(Q+2*R+S+2)/4  PRED[3,3]=(R+2*S+T+2)/4; |

FIG. 22B

Case 15

| Mode | Content |
|---|---|
| Mode 0 Vertical | PRED[0,0]=PRED[1,0]=A  PRED[2,0]=PRED[3,0]=Q<br>PRED[0,1]=PRED[1,1]=B  PRED[2,1]=PRED[3,1]=R<br>PRED[0,2]=PRED[1,2]=C  PRED[2,2]=PRED[3,2]=S<br>PRED[0,3]=PRED[1,3]=D  PRED[2,3]=PRED[3,3]=T |
| Mode 1 Horizontal | PRED[0,0]=PRED[0,1]=I   PRED[0,2]=PRED[0,3]=M<br>PRED[1,0]=PRED[1,1]=J   PRED[1,2]=PRED[1,3]=N<br>PRED[2,0]=PRED[2,1]=K   PRED[2,2]=PRED[2,3]=O<br>PRED[3,0]=PRED[3,1]=L   PRED[3,2]=PRED[3,3]=P |
| Mode 2 DC | PRED[0,0]=PRED[0,1]=PRED[0,2]=PRED[0,3]=<br>PRED[1,0]=PRED[1,1]=PRED[1,2]=PRED[1,3]=<br>PRED[2,0]=PRED[2,1]=PRED[2,2]=PRED[2,3]=<br>PRED[3,0]=PRED[3,1]=PRED[3,2]=PRED[3,3]=(A+B+C+D+I+J+K+L+M+N+O+P+Q+R+S+T+8)/16 |
| Mode 3 Diagonal down left | PRED[0,0]=(A+2*B+C+2)/4<br>PRED[0,1]=PRED[1,0]=(B+D+2*C+2)/4<br>PRED[0,2]=PRED[1,1]=PRED[2,0]=(C+E+2*D+2)/4<br>PRED[0,3]=PRED[1,2]=PRED[2,1]=PRED[3,0]=(D+F+2*E+2)/4<br>PRED[1,3]=PRED[2,2]=PRED[3,1]=(E+G+2*F+2)/4<br>PRED[2,3]=PRED[3,2]=(F+H+2*G+2)/4<br>PRED[x,y]=(p(x+y,-1)+2p(x+y-1,-1)+p(x+y+2,-1))/4 |
| Mode 4 Diagonal down right | PRED[0,1]=PRED[1,2]=PRED[2,3]=(X+2*A+B+2)/4<br>PRED[0,2]=PRED[1,3]=(B+2*C+D+2)/4<br>PRED[1,3]=(A+2*B+C+2)/4;<br>PRED[0,0]=PRED[1,1]=PRED[2,2]=PRED[3,3]=(I+2*X+A+2)/4<br>PRED[1,0]=PRED[2,1]=PRED[3,2]=(J+2*I+X+2)/4<br>PRED[2,0]=PRED[3,1]=(K+2*J+I+2)/4<br>PRED[3,0]=(J+2*K+L+2)/4 |

Continue from FIG. 23A

| | | |
|---|---|---|
| Mode 5 Vertical Right | Case: 15(All) : Same Convention | PRED[0,0]=PRED[2,1]=(X+A+1)/2  PRED[0,1]=PRED[2,2]=(A+B+1)/2<br>PRED[0,2]=PRED[2,3]=(B+C+1)/2<br>PRED[1,0]=PRED[3,1]=(I+2*X+A+2)/4  PRED[1,1]=PRED[3,2]=(X+2*A+B+2)/4<br>PRED[1,2]=PRED[3,3]=(A+2*B+C+2)/4<br>PRED[0,3]=(C+D+1)/2  PRED[1,3]=(B+2*C+D+2)/4<br>PRED[2,0]=(X+2*I+J+2)/4  PRED[3,0]=(I+2*J+K+2)/4 |
| Mode 6 Horizontal down | Case: 15(All) : Same Convention | PRED[0,0]=PRED[1,2]=(X+I+1)/2  PRED[0,1]=PRED[1,3]=(I+2*X+A+2)/4<br>PRED[1,0]=PRED[2,2]=(I+J+1)/2  PRED[1,1]=PRED[2,3]=(X+2*I+J+2)/4<br>PRED[2,0]=PRED[3,2]=(J+K+1)/2  PRED[2,1]=PRED[3,3]=(I+2*J+K+2)/4<br>PRED[0,2]=(X+2*A+B+2)/4  PRED[0,3]=(A+2*B+C+2)/4<br>PRED[3,0]=(K+L+1)/2  PRED[3,1]=(J+2*K+L+2)/4 |
| Mode 7 Vertical left | Case: 15(All) : Same Convention | PRED[0,0]=PRED[2,1]=(B+C+1)/2  PRED[0,2]=PRED[2,1]=(C+D+1)/2<br>PRED[0,3]=PRED[2,2]=(D+E+1)/2  PRED[3,0]=(B+2*C+D+2)/4<br>PRED[1,2]=PRED[3,1]=(C+2*D+E+2)/4;<br>PRED[1,3]=PRED[3,2]=(D+2*E+F+2)/4;<br>PRED[0,0]=(A+B+1)/2<br>PRED[2,3]=(E+F+1)/2  PRED[3,3]=(E+2*F+G+2)/4<br>PRED[1,0]=(A+2*B+C+2)/4 |
| Mode 8 Horizontal Up | Case: 15(All) | PRED[0,0]=(I+J+1)/2<br>PRED[0,1]=(I+2*J+K+2)/4<br>PRED[0,2]=PRED[1,0]=(J+K+1)/2  PRED[0,3]=PRED[1,1]=(J+2*K+L+2)/4<br>PRED[1,2]=PRED[2,0]=(K+L+1)/2  PRED[1,3]=PRED[2,1]=(K+2*L+L+2)/4<br>PRED[3,0]=PRED[2,2]=(3*Q+R+2)/4  PRED[2,3]=PRED[3,1]=(Q+R+1)/2<br>PRED[3,2]=(Q+2*R+S+2)/4  PRED[3,3]=(R+2*S+T+2)/4; |

*FIG. 23B*

IMAGE CODING/DECODING DEVICE USING CODING BLOCK IN WHICH INTRA BLOCK AND INTER BLOCK ARE MIXED, AND METHOD THEREOF

TECHNICAL FIELD

The present disclosure in one or more embodiments relates to video encoding/decoding apparatuses using coding blocks with combined intra and inter blocks, and method thereof. More particularly, the present disclosure relates to video encoding/decoding apparatus applicable to encoding/decoding high-resolution videos by using extended coding blocks wherein the apparatuses can divide a single extended coding block into differently sized blocks before entering the encoding/decoding performance as well as perform the encoding/decoding in units of extended coding block even with inter and intra modes combined.

BACKGROUND

The statements in this section merely provide background information related to the present disclosure and may not constitute prior art.

Moving Picture Experts Group (MPEG) and Video Coding Experts Group (VCEG) have developed video compression technologies that are more excellent than and superior to the existing MPEG-4 Part 2 and H.263 standard. This new standard is called H.264/AVC (Advanced Video Coding) and was jointly announced as MPEG-4 Part 10 AVC and ITU-T Recommendation H.264.

H.264/AVC (hereinafter, referred to as 'H.264') utilizes a spatial prediction coding method different from the existing international video coding standards, such as MPEG-1, MPEG-2, MPEG-4 Part 2 Visual, and the like. The conventional method utilizes "intra prediction" for coefficients transformed in a DCT transform domain so as to increase the coding efficiency, resulting in degradation in subjective picture quality at a low-band transmission bit rate. However, H.264 adopts a spatial intra prediction encoding method in a spatial domain, instead of a transform domain.

According to the spatial intra prediction in terms of a video encoder, information on a block to be currently encoded is predicted from information of previously encoded and reproduced block, and only difference information of actual block information to be encoded is encoded and transmitted to a video decoder. In this case, the prediction may also be performed by transmitting prediction direction information necessary for prediction to the video decoder, or synchronizing the video encoder and the video decoder. In terms of the video decoder, information of the block to be currently decoded is predicted by using information of previously decoded and reproduced peripheral (or neighboring) blocks, and desired configuration information is reproduced by obtaining the sum of the predicted block information and the difference information transmitted from the video encoder. Even in this case, when prediction direction information required for prediction is transmitted, the corresponding prediction direction information is used after decoding.

H.264 performs encoding or decoding in units of macroblocks of 16×16 pixel block size by using either of intra prediction and inter prediction. Examples of the intra prediction according to H.264 standard include intra 4×4 prediction, intra 8×8 prediction, and intra 16×16 prediction, each of which includes a plurality of prediction modes. In addition, the intra prediction generates predicted blocks by using previously encoded or decoded pixels located directly above and on the left of a block to be encoded or decoded.

In the case of the intra 4×4 prediction, as shown in FIG. 1, nine prediction modes are defined in consideration of positions and prediction directions of peripheral (or neighboring) pixels. The nine prediction modes include a vertical mode (mode 0), a horizontal mode (mode 1), a direct current (DC) mode (mode 2), a diagonal down-left mode (mode 3), a diagonal down-right mode (mode 4), a vertical-right mode (mode 5), a horizontal-down mode (mode 6), a vertical-left mode (mode 7), and a horizontal-up mode (mode 8).

In the case of the intra 8×8 prediction, the nine prediction directions shown in FIG. 1 are used as in the case of the intra 4×4 prediction, and a method of calculating the predicted pixels is substantially identical to the intra prediction encoding based on units of 4×4 pixels, except for a difference in block size (4×4 pixels against 8×8 pixels).

Furthermore, in the case of the intra 16×16 prediction, four prediction modes are defined as including a vertical mode (mode 0), a horizontal mode (mode 1), a DC mode (mode 2), and a plane mode (mode 3), as shown in FIG. 2.

Referring to FIGS. 1 and 2, peripheral pixels used for prediction are limited to the left and top. This is because only pixels reconstructed after the decoding process are usable for prediction. The encoder encodes blocks from left to right and from top to bottom, depending on a coding order, and a bitstream resulting from block compression is also transmitted sequentially to the decoder. Therefore, reconstructed pixels exist on the left and top of the block to be currently encoded. However, since peripheral pixels usable for the intra prediction are limited to the left and top, spatial redundancy may not be effectively reduced in the intra prediction mode, which is a main factor to lower compression efficiency.

Meanwhile, in H.264 standard, the intra 8×8 prediction or the intra 4×4 prediction within the macroblock determines a block coding order according to a raster scan method as shown in FIG. 3. The raster scan method is suitable in the case of considering only pixels located on the left and top of the current block to be encoded or decoded, as shown in FIGS. 1 and 2. However, the raster scan method has a problem that cannot consider previously encoded or decoded pixels located on the right and bottom among the peripheral pixels of the current block.

In particular, in order to efficiently compress a high-resolution video such as a 4K×2K video, research has recently been conducted on an encoding/decoding method using a macroblock having a size larger than a 16×16 pixel-block (hereinafter, referred to as an extended macroblock for the sake of convenience). Even with the use of such extended macroblock, the encoding/decoding operation has been performed by only making divisions in units of 16×16 pixel-blocks as in the H.264 method. For example, assuming that the size of the extended macroblock is a 32×32 pixel-block, a syntax structure in the case of using the extended macroblock is provided as shown in FIG. 4. Also, since four 16×16 macroblocks exists in the extended macroblock, data of 16×16 macroblock units are contained in data of the extended macroblock. In this case, when the encoding/decoding is performed in units of 16×16 macroblocks, a single macroblock may use only one of an intra prediction mode and an inter prediction mode. However, in order for efficiently encoding/decoding high-resolution videos, it is necessary to perform the encoding/decoding in units of extended coding blocks. In the case where large-sized extended coding blocks, such as 32×32 pixel-blocks or 64×64 pixel-blocks, are used as encoding/decoding units, statistical features different from the existing encoding/decoding methods are variously generated.

For example, when there are signals having a lot of motions or a spatially complicated type in high-resolution videos, compression efficiency can be improved when blocks inside the extended coding block are encoded/decoded only through a combination of inter and intra modes. If the existing video encoding/decoding method is used, the encoding/decoding efficiency is lowered and the picture quality is degraded.

In addition, as described above, the H.264 intra prediction generates predicted blocks by using previously encoded or decoded pixels located directly on the top and on the left of the block to be encoded or decoded. In the case where the video encoding/decoding is performed in units of extended coding blocks, when videos are encoded or decoded in the combined inter and intra modes in the extended coding blocks, the existing intra prediction method may not utilize pixels located on the bottom of the current block to be encoded or decoded and pixels located on the right thereof. Consequently, it may be difficult to increase the compression efficiency.

DISCLOSURE

Technical Problem

Therefore, one or more embodiment of the present disclosure is directed to provide video encoding/decoding apparatus and method applicable to encoding/decoding high-resolution videos by using extended coding blocks wherein the apparatuses and methods can divide a single extended coding block into differently sized blocks before entering the encoding/decoding operation as well as perform the encoding/decoding in units of extended coding block even with inter and intra modes combined.

Other embodiments of the present disclosure are directed to provide video encoding/decoding apparatus and method, which can improve prediction performance by performing the encoding and decoding in consideration of pixels located below and on the right of current block as well as pixels located above and the left of current block when intra prediction encoding/decoding is performed upon encoding/decoding in units of extended coding blocks.

In addition, further embodiments of the present disclosure are directed to provide video encoding/decoding apparatus and method, which scan blocks, that is, determine an encoding/decoding order within the extended coding block, considering the case of encoding/decoding the current block by using pixels located below and/or on the right of the current block, upon using extended coding block.

Furthermore, embodiments of the present disclosure are directed to provide video encoding apparatus and method, which can transmit an encoding or decoding order of each block to a decoding apparatus, without transmitting additional bits, by arranging information of each block within extended coding block at an extended coding block layer, instead of each block layer, in the same order as the encoding order of each block within a bitstream.

SUMMARY

An aspect of the present disclosure provides a video encoding/decoding apparatus including: a video encoder for dividing a coding unit block into a combination of subblocks of codable size, determining a combination of inter blocks and intra blocks with respect to the respective subblocks, determining an encoding order of intra encoding blocks within the coding unit in consideration of referencing possibility of peripheral pixel values of a current block to be intra-prediction encoded, performing bi-directional intra prediction encoding on the current block in the determined encoding order, and transmitting encoding mode and size information of the subblocks after locating the encoding mode and size information in front of a syntax of the coding unit; and a video decoder for restoring the encoding mode and size information of the subblocks within the coding unit by decoding encoding data, reconstructing inter prediction encoded blocks, based on the restored encoding mode information, and determining decoding order of intra prediction mode blocks according to the encoding mode and size information of the respective subblocks within the coding unit, and conditions on referencing possibility of peripheral blocks of the coding unit.

Another embodiment of the present disclosure provides a video encoding apparatus including: a predictor for dividing a coding unit into a combination of subblocks of codable sizes, and generating a prediction block by performing prediction based on an intra prediction mode or an inter prediction mode with respect to a current block to be encoded among the subblocks; a subtractor for generating a residual block by subtracting the prediction block from the current block; a transformer/quantizer for generating a quantized transform coefficient by transforming and quantizing the residual block; and an encoder for generating encoded video data by encoding the quantized transform coefficient.

The coding unit may have a size of an N×N pixel-block (where N is an integer equal to or larger than 16).

The predictor may divide the coding unit into any one of square subblocks, square and rectangular subblocks, and rectangular subblocks.

When prediction by an intra prediction mode is performed on the current block, the predictor may reference one or more pixels located above, below, on the left and on the right of the current block.

The encoder may encode an inter prediction block among the subblocks within the coding unit, and encodes an intra prediction block.

When encoding the respective subblocks, the encoder may determine an encoding order of the subblocks, such that the number of peripheral blocks previously encoded around the block when encoding the respective subblocks is increased.

The entire subblocks within the coding unit may be encoded in the intra prediction mode.

The subblocks may be predicted by one or more of a square intra prediction and an arbitrary-rectangular intra prediction.

The subblocks within the coding unit may be encoded by a combination of the inter prediction mode and the intra prediction mode.

The subblocks may be predicted by one or more of a square intra prediction, a square inter prediction, an arbitrary-rectangular intra prediction, and an arbitrary-rectangular intra prediction.

An encoding order of the subblocks may be determined according to existence patterns of peripherally available pixels.

The encoder may locate mode and shape/size information of the respective subblocks within the coding unit in front of coding unit information in a syntax of a transport bitstream.

The encoder may locate the mode and shape/size information, located in the head coding unit, in the same order as a raster scan order of the subblocks within the coding unit.

The encoder may omit additional bit transmission.

Yet another embodiment of the present disclosure provides a video decoding apparatus including: a video decoder for restoring encoding mode and size information of subblocks within a coding unit by decoding encoding data, reconstructing inter prediction encoded blocks, based on the restored encoding mode information, determining a decoding order of intra prediction mode blocks according to the encoding mode and size information of the respective subblocks within the coding unit, and conditions on referencing possibility of peripheral blocks of the coding unit, and restoring a quantized transform coefficient of a current block; an inverse quantizer/inverse transformer for reconstructing residual subblocks with respect to the respective subblocks by inversely quantizing and inversely transforming the quantized transform coefficient; a predictor for generating a predicted block by using the encoding mode and size information reconstructing the current block; and reconstructing the current block by adding the predicted block to the residual block.

Yet another embodiment of the present invention provides a video encoding/decoding method including: dividing a coding unit into a combination of subblocks of codable sizes, determining a combination of inter blocks and intra blocks with respect to the respective subblocks, determining an encoding order of intra encoding blocks within the coding unit in consideration referencing possibility of peripheral pixel values of a current block to be intra-prediction encoded, performing bi-directional intra prediction encoding on the current block in the determined encoding order, and transmitting encoding mode and size information of the subblocks after locating the encoding mode and size information in front of a syntax of the coding unit; and restoring the encoding mode and size information of the subblocks within the coding unit by decoding encoding data, reconstructing inter prediction encoded blocks, based on the restored encoding mode information, and determining a decoding order of intra prediction mode blocks according to the encoding mode and size information of the respective subblocks within the coding unit, and conditions on referencing possibility of peripheral blocks of the coding unit.

Yet another embodiment of the present disclosure provides a video encoding method including: dividing a coding unit into a combination of subblocks of codable sizes, and determining a combination of inter blocks and intra blocks with respect to the subblocks; determining an encoding order of intra encoding blocks within the coding unit in consideration of a referencing possibility of peripheral pixel values of a current block to be intra-prediction encoded among the subblocks; performing bi-directional intra prediction encoding on the current block according to a determined encoding order; and transmitting encoding mode and size information of the subblocks after locating the encoding mode and size information in front of a syntax of the coding unit.

The process of determining the combination of the inter blocks and the intra blocks may determine a combination of inter blocks and intra blocks, such that encoding costs are minimized.

Yet another embodiment of the present invention provides a video decoding method including: restoring encoding mode and size information of subblocks within a coding unit by decoding encoding data; and determining a decoding order of intra prediction mode blocks according to encoding mode and size information of the respective subblocks within the coding unit and a referenceable condition of peripheral blocks of the coding unit.

The video decoding method may further include decoding inter prediction encoded blocks, based on restored encoding mode information, wherein a decoding order of the intra prediction mode blocks is determined after the inter prediction encoded blocks are decoded.

Advantageous Effects

According to the present disclosure as described above, high-resolution videos can be encoded/decoded by using extended coding blocks wherein a single extended coding block is divided into differently sized blocks before entering the encoding/decoding performance as well as perform the encoding/decoding in units of extended coding block even with inter and intra modes combined.

In addition, according to the present disclosure as described above, prediction performance can be improved by performing the encoding and decoding in consideration of pixels located below and on the right of current block as well as pixels located above and on the left of current block when intra prediction encoding/decoding is performed upon encoding/decoding in units of extended coding blocks.

In addition, according to the present disclosure as described above, blocks can be scanned, that is, an encoding/decoding order within the extended coding block can be determined, considering the case of encoding/decoding the current block by using pixels located below and/or on the right of the current block, upon using extended coding block.

Furthermore, an encoding or decoding order of each block can be transmitted to a decoding apparatus, without transmitting additional bits, by arranging information of each block within extended coding block at an extended coding block layer, instead of each block layer, in the same order as the encoding order of each block within a bitstream.

DESCRIPTION OF DRAWINGS

FIGS. 9A-B through 23A-B respectively compose exemplary diagrams of a novel intra prediction method designed by different conditions of referenceable peripheral blocks where 4×4 block is used;

DETAILED DESCRIPTION

Figure 1:
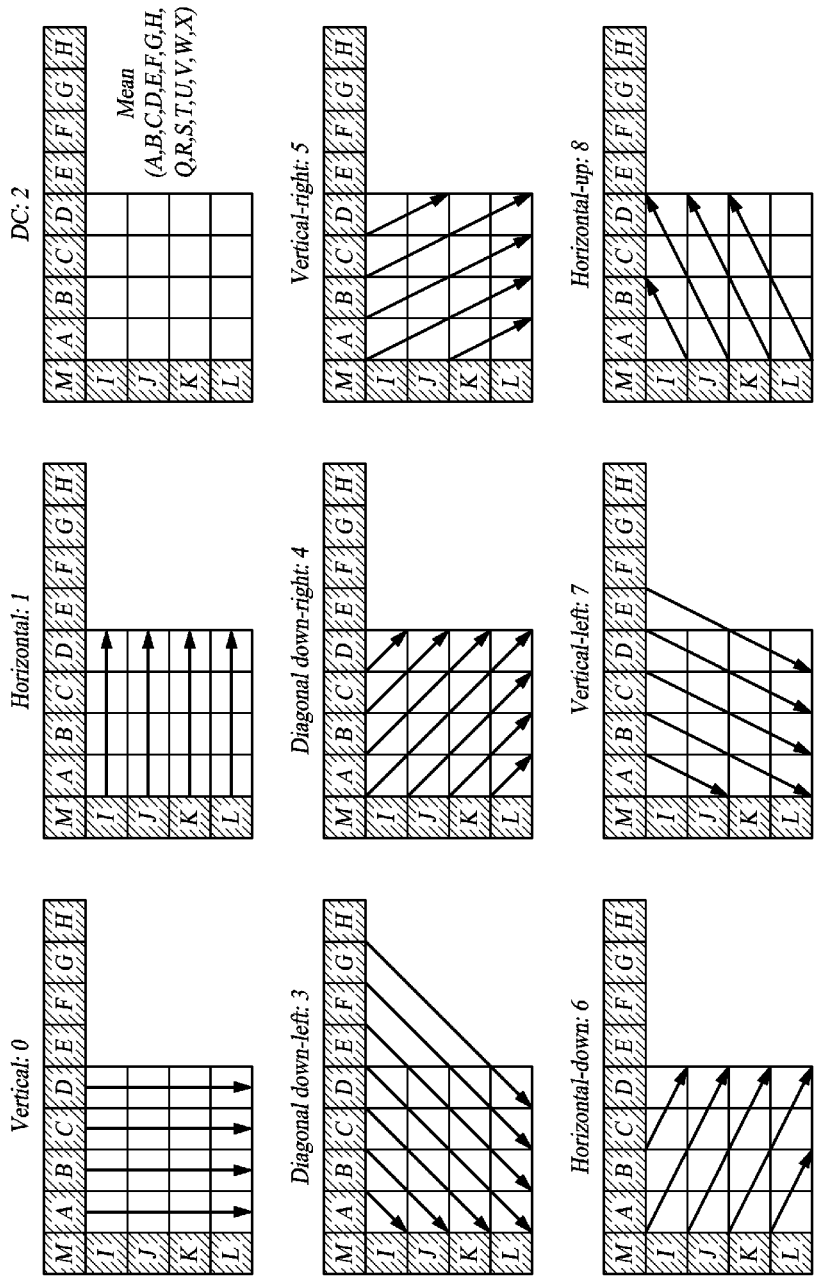
FIG. 1 is a diagram showing nine different typical 4×4 intra prediction modes according to H.264 standard.
Figure 2:
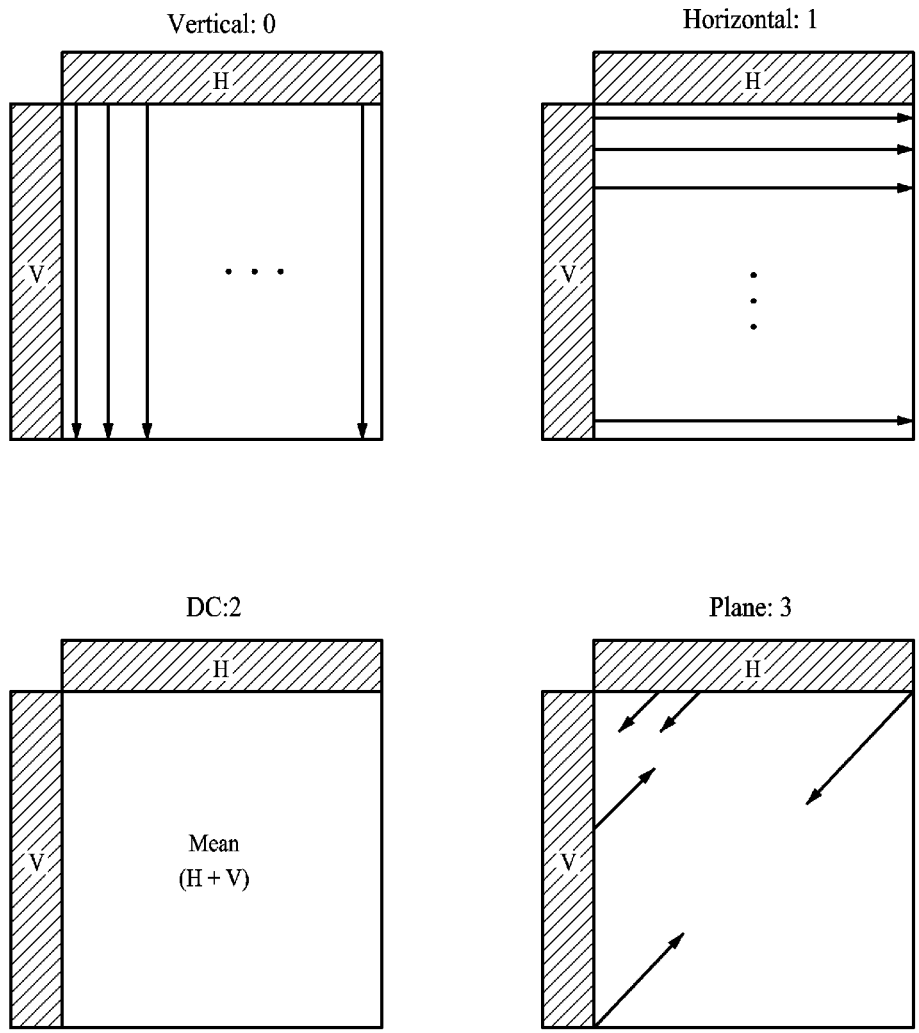
FIG. 2 is a diagram showing nine different typical 16×16 intra prediction modes according to H.264 standard.
Figure 3:
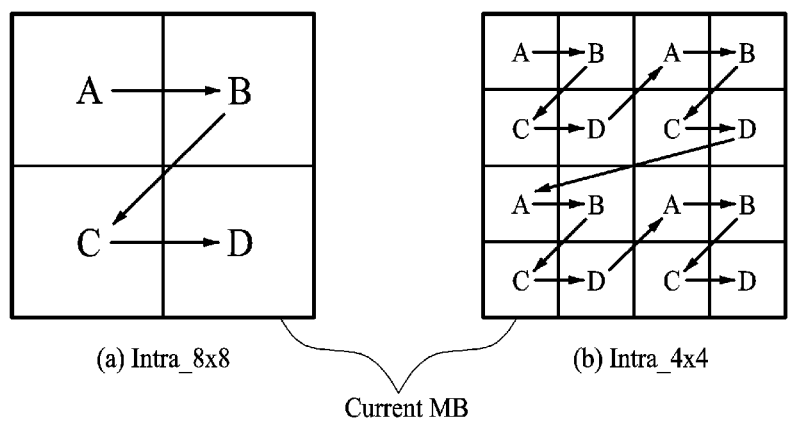
FIG. 3 is a diagram showing sequences of scanning blocks in a macroblock in the cases of intra 8×8 prediction and intra 4×4 prediction.
Figure 4:
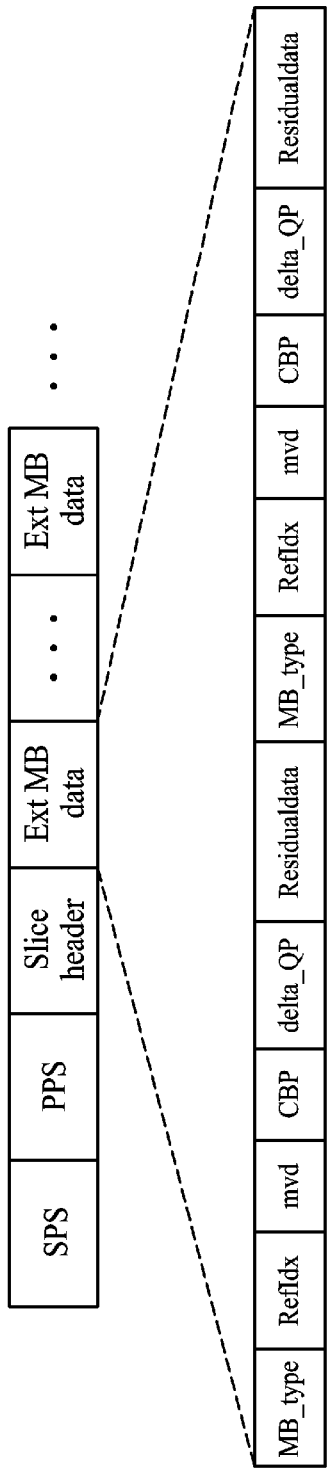
FIG. 4 is a diagram showing a syntax structure for when an extended macroblock is used in conventional video encoding/decoding method.

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A video encoding apparatus and a video decoding apparatus according to one or more embodiment, as described below, may be a personal computer (PC), a notebook computer, a personal digital assistant (PDA), a portable multimedia player (PMP), a PlayStation Portable (PSP), or a wireless communication terminal, a smart phone, or the like, and refers to a variety of apparatuses equipped with, for example, a communication device such as a communication modem for performing communications between various devices or wired/wireless communication networks, a memory for storing various programs for encoding or decoding videos and relevant data, and a microprocessor for executing the programs to perform operations and controls.

In addition, the video encoded into a bitstream by the video encoding apparatus may be transmitted in real time or non-real-time to the video decoding apparatus for decoding the same where it is reconstructed and reproduced into the video after being transmitted via a wired/wireless communication network including Internet, a short range wireless communication network, a wireless LAN network, a WiBro or WiMAX network, a mobile communication network, and a public switched telephone network, or a communication interface such as a cable or a universal serial bus (USB).

Figure 5:
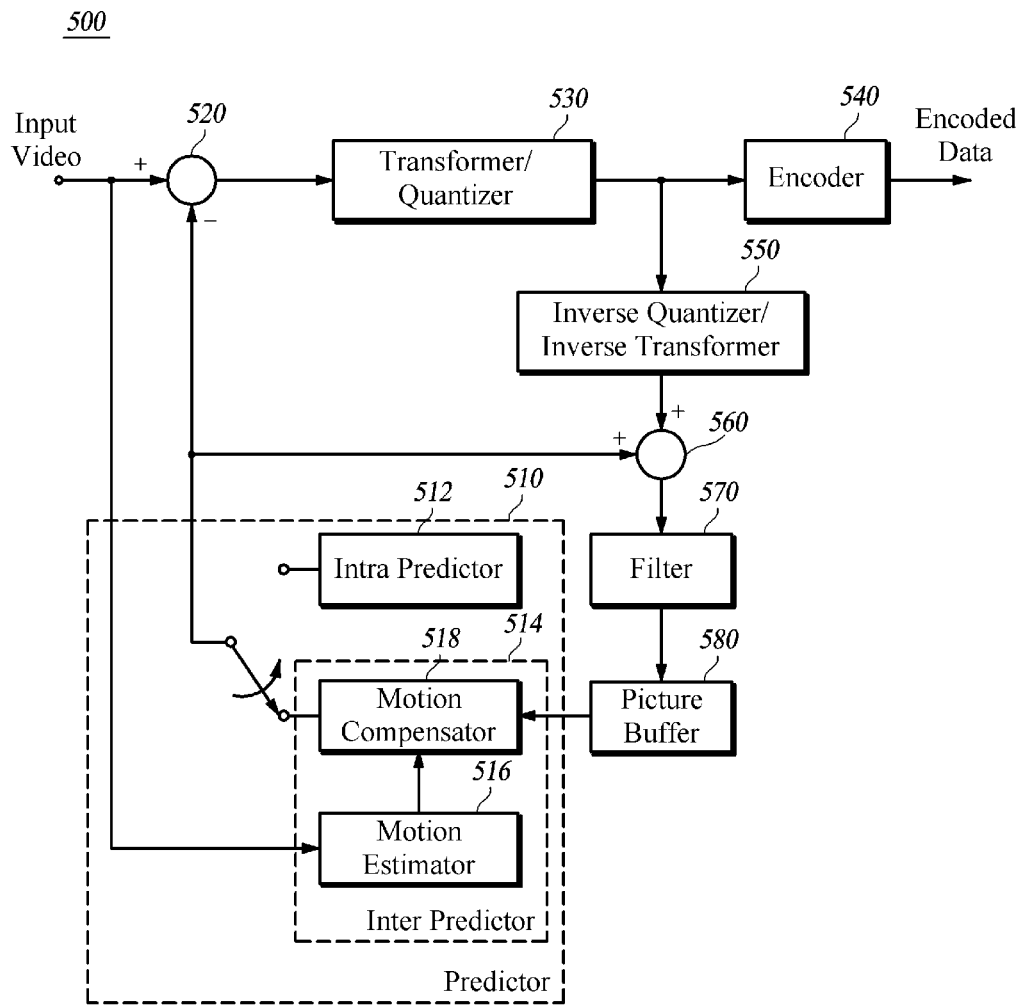
FIG. 5 is a diagram schematically showing a video encoding apparatus according to one or more embodiment of the present disclosure.

FIG. 5 is a block diagram schematically showing a video encoding apparatus according to one or more embodiment of the present disclosure.

The video encoding apparatus 500 according to one or more embodiment of the present disclosure may include a predictor 510, a subtractor 520, a transformer/quantizer 530, an encoder 540, an inverse quantizer/inverse transformer 550, an adder 560, a filter 570, and a picture buffer 580.

The predictor 510 may include an intra predictor 512 and an inter predictor 514. The inter predictor 514 may include a motion estimator 516 and a motion compensator 518.

The intra predictor 512 generates a predicted block by predicting a current block, and the subtractor 520 generates a residual block by subtracting the predicted block from the current block. The transformer/quantizer 530 generates a quantized transform coefficient by transforming/quantizing the residual block, and the encoder 540 generates encoded data by entropy-encoding the quantized transform coefficient.

The transformer/quantizer 530 may perform a 4×4 transform on a residual block of the current block for which intra prediction based on units of 4×4, 4×8 or 8×4 pixels of luminance component are selected, and may perform an 8×8 transform on a residual block of the current block for which intra prediction based on units of 8×8, 8×16 or 16×8 pixels are selected. In addition, the transformer/quantizer 530 may perform a 16×16 transform on a residual block of the current block for which intra prediction based on units of 16×16 or more pixels are selected. In this case, since the unit of the intra prediction and the size of the subblock are equal to each other, a transform type may be determined according to the block size of the subblock.

The residual block transformed and quantized by the transformer/quantizer 530 is inversely quantized and inversely transformed by the inverse quantizer/inverse transformer 550 to reconstruct the residual block. The adder 560 reconstructs the current block by adding the reconstructed residual block to the predicted block predicted by the predictor 510.

The filter 570 filters a picture, which is generated by accumulating the current blocks reconstructed by the adder 560, by using a deblocking filter. The filtered picture is stored in the picture buffer 580 and is used as a reference picture for a next picture.

An input video may be inputted to the video encoding apparatus 500 in units of frames or fields, or may be inputted to the video encoding apparatus 500 after being divided into macroblocks having N×N pixels (N is an integer equal to or larger than 16). That is, when the input video is high-resolution video such as 4K×2K video, the input video may be encoded after being divided into coding blocks having N×N pixels (where N is an integer greater than 16), thereby achieving improvement in video compression efficiency. Herein, the coding block having N×N pixels (where N is an integer greater than 16) will be referred to as extended coding unit (CU). For example, the coding unit (CU) may include square pixel-blocks with sizes such as 64×64 or 32×32. It should be noted that the coding block as described below is a pixel-block whose size is not specified, and may refer to a CU or a typical 16×16 pixel-block.

Figure 6:
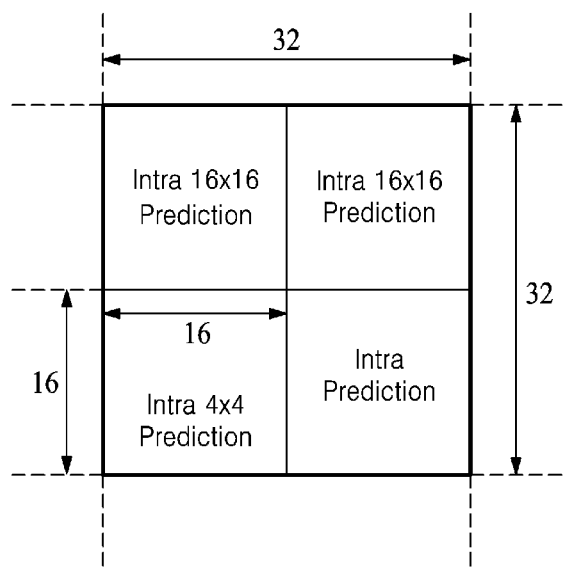
FIG. 6 is a diagram showing an exemplary combined use of intra prediction blocks and inter prediction blocks in an extended coding block.
Figure 7:
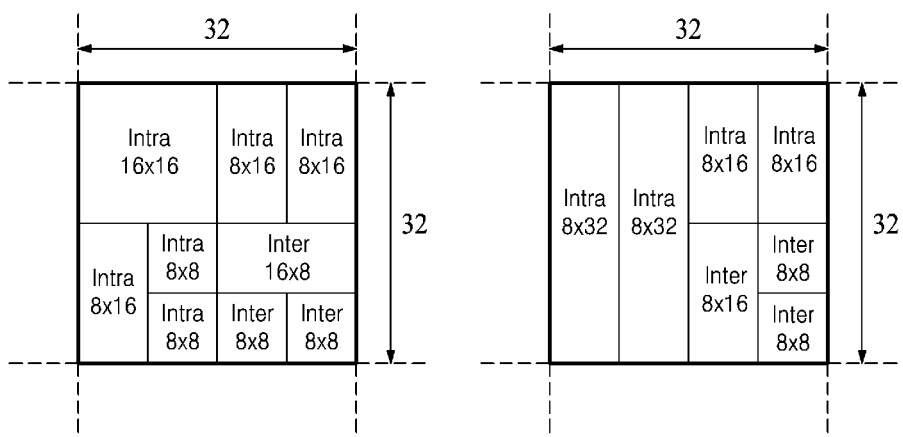
FIGS. 7A and 7B are diagrams respectively showing other exemplary combined uses of intra prediction blocks and inter prediction blocks in an extended coding block.

When high-resolution input video is encoded after being divided in units of CU, the predictor 510 may internally divide the coding unit (CU) into smaller subblocks and perform intra prediction encoding or inter prediction encoding on the subblocks. In this case, the CU may perform encoding on the subblocks by using the intra prediction encoding and the inter prediction encoding in combination. In addition, even the intra-prediction-encoded subblocks within the CU may be prediction-encoded in units of blocks having other sizes. For example, assuming that the size of the CU is 32×32 pixel-block as shown in FIG. 6, the encoding may be performed by using intra 16×16 prediction encoding, intra 4×4 prediction encoding, and/or intra 8×8 prediction encoding in combination. Although it is assumed in FIG. 6 that the size of the CU is the 32×32 pixel-block, the size of the CU is not limited thereto. Also, although it is shown that the subblocks within the CU are provided with a combination of two 16×16× pixel-blocks subject to the intra 16×16 prediction encoding, a single 16×16 pixel-block subject to the intra 4×4 prediction encoding, and a single 16×16 pixel-block subject to the inter prediction encoding, the number, position and shape of the blocks subject to the intra prediction encoding are not limited thereto. In addition, it has been described that the subblocks within the CU are encoded in units of 16×16 pixel-block, the subblocks within the CU may also be encoded in units of variously sized pixel-blocks. For example, when the encoding is performed in units of 16×16 pixel-block as shown in FIG. 7A, the 16×16 pixel-block may be encoded in various sizes, for example, by two intra 8×16 prediction encodings, or by a single intra 8×16 prediction encoding and two 8×8 prediction encoding, or by a single inter 16×8 prediction encoding and two inter 8×8 prediction encoding. In addition, as shown in FIG. 7B, the intra prediction encoding on the subblocks within the CU is not limited to the units of 16×16 pixel-block, but may be performed in units of variously sized pixel-blocks, for example, 8×32 pixel-blocks, 32×8 pixel-blocks, 16×32 pixel-blocks, and 32×16 pixel-blocks. The intra prediction encoding on such variously sized pixel-blocks can be performed because pixels located below and on the right of the current block to be encoded, as well as pixels located above and on the left of the current block, are considered.

Figure 8:
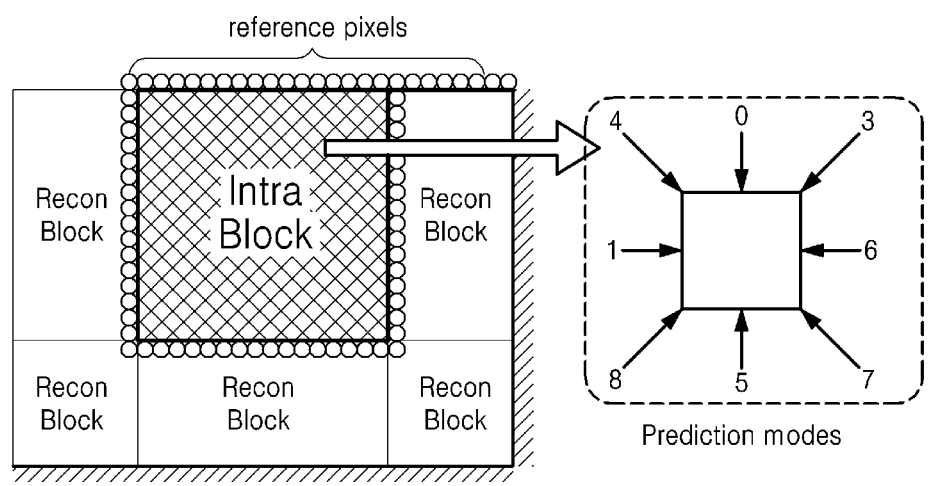
FIG. 8 is a diagram illustrating an intra prediction encoding according to one or more embodiment of the present disclosure.

FIG. 8 is a diagram showing intra prediction encoding according to one or more embodiment of the present disclosure. In FIG. 8, "intra block" refers to subblocks within the CU. As described above, if the pixels located below and on the right of the current block to be encoded, as well as the pixels located above and on the left of the current block, are completely encoded and decoded and therefore there are pixel values that can be referred to, the intra prediction encoding according to the embodiment of the present disclosure is performed more efficiently by using the pixels values as reference information. In this case, the usable reconstructed pixel values located below and on the right of the current block may be pixels located outside the CU, or may be a previously encoded intra mode block or a previously encoded inter mode block within the current CU. Various intra prediction methods may be provided according to the number and positions of pixels, of which pixel values are usable because the encoding and decoding has already been performed thereon.

The design of the intra prediction filter is changed according to various intra prediction directions. For example, when the intra prediction method according to the embodiment of the present disclosure is applied to 4×4 block, novel intra prediction methods designed by different conditions of referenceable peripheral blocks are shown in FIGS. 9A-B through 23A-B. Cases 1 through 15 shown respectively in FIGS. 9A-B through 23A-B are classified according to positions and number of pixels, which is previously encoded and thus usable, in the vicinity of the current encoding block. FIGS. 9A-B through 23A-B show examples for the 4×4 block. With respect to variously sized blocks, such as 8×8 block, 16×16 block, and m×n rectangular block (where m×n represents a size of a subblock divided within a CU having an N×N size where N is an integer equal to or larger than 16), as well as the 4×4 block, the prediction methods can be calculated according to the number and position of the usable pixel values of the peripheral block (right, up, left, down). Since the methods are easily derived from the methods of FIGS. 9A-B through 23A-B, a detailed description thereof will be omitted.

Although only nine intra predictions are used in FIGS. 9A-B to 23-B, the methods can be used in more various intra prediction directions as well as nine directions. For example, seventeen directions can be predicted by adding prediction directions between eight directions, except for a DC mode. Furthermore, thirty-four directions can also be predicted. Even when the number of the prediction directions increases, a prediction filter can be made bi-directionally by methods that are identical to or extended from the methods of FIGS. 9A-B through 23A-B. Since the prediction filter is well known, a detailed description thereof will be omitted.

Figure 24:
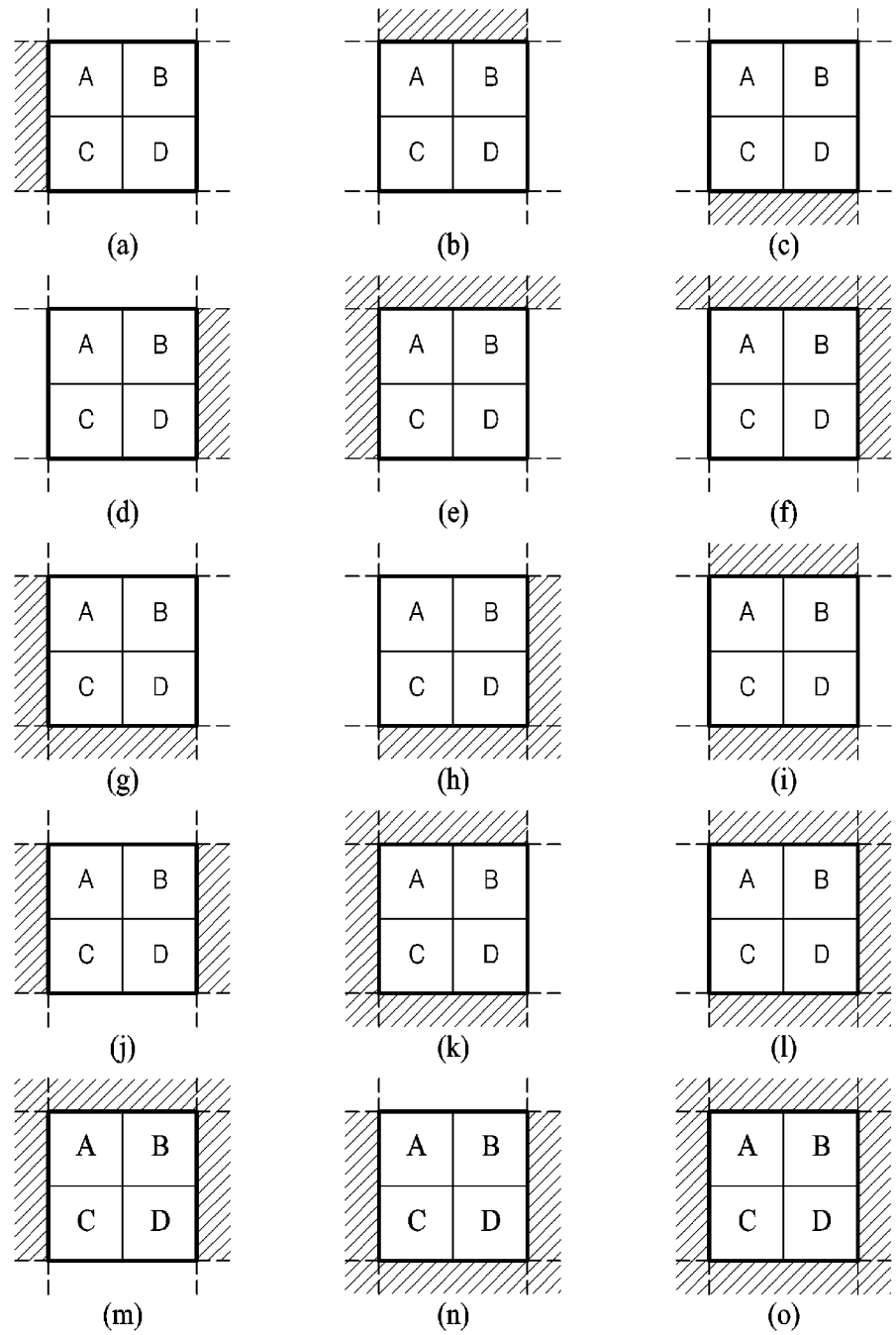
FIG. 24 illustrates cases of utilizing information of previously encoded and decoded peripheral pixels among peripheral blocks of current extended coding block.

There is an instance where the current CU has some already encoded and decoded peripheral blocks, which is information the current CU can take advantage of. FIG. 24 illustrates such cases. The conventional video coding method can use the cases of FIGS. 24(a), 24(b) and 24(e), but the embodiments of the present disclosure propose technologies that can be used in other cases. In the embodiment of the present disclosure, there is no limitation to the way how the previously encoded and decoded peripheral blocks usable for the prediction encoding exist.

When encoding the CU, the coding order of the internal blocks is adaptively changed according to the number and type of referenceable peripheral blocks. In the embodiment of the present disclosure, when coding the respective internal coding blocks, the coding order of the internal blocks of the CU is determined to increase the number of previously decoded peripheral blocks usable for intra prediction of the corresponding block around the coding block.

Figure 25:
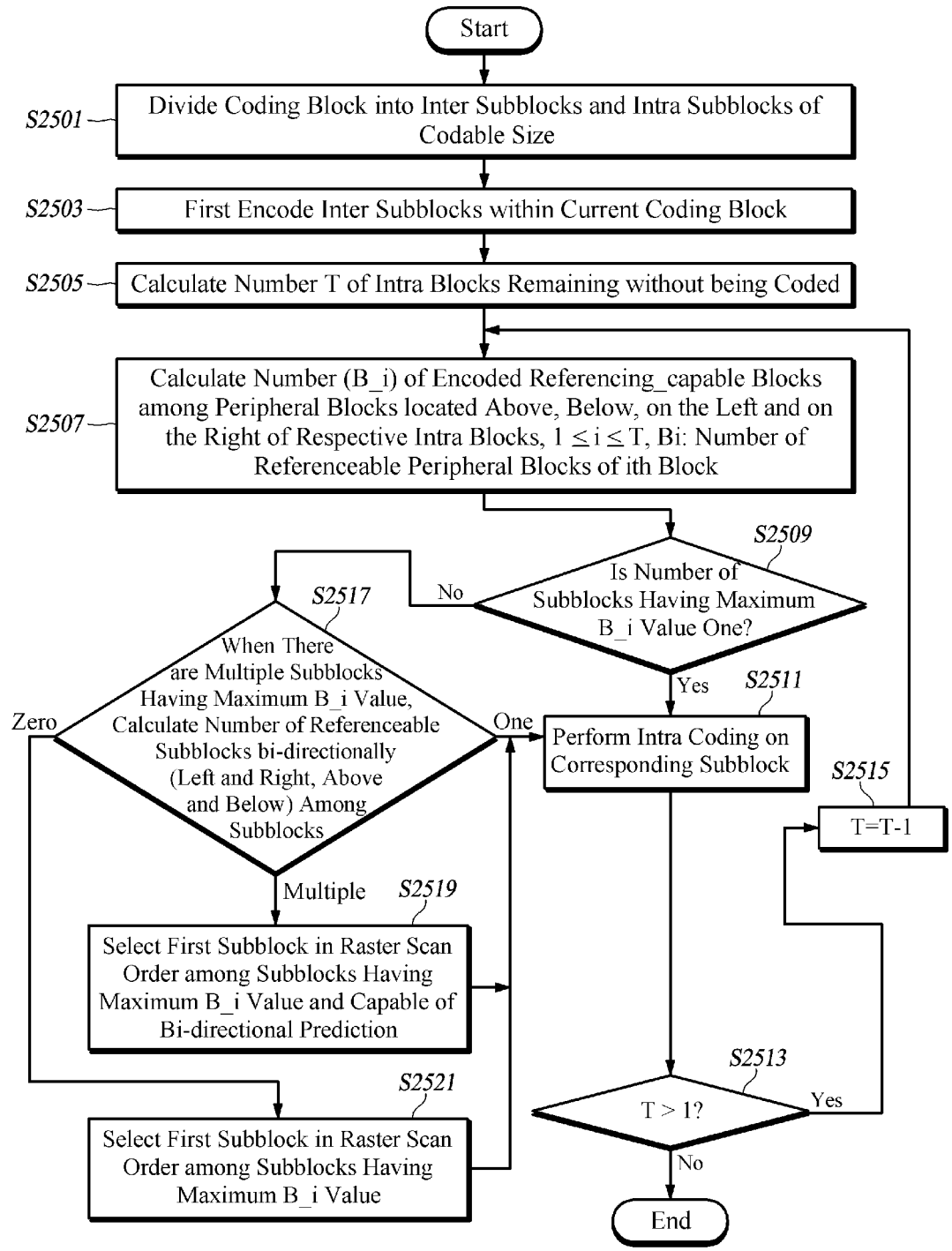
FIG. 25 is a flowchart of a method of determining inter block-based coding order of internal blocks within coding blocks.

FIG. 25 is a flowchart of a method of determining the coding order of the internal blocks when encoding the CU. First, the CU is divided into a combination of subblocks of codable size (S2501), and inter subblocks within the coding block are encoded (S2503). The number of intra subblocks remaining without being coded is set as T (S2505). Cases that are capable of referencing peripheral pixel values of the respective subblocks subject to intra prediction encoding are considered. The number B_i of referenceable peripheral blocks of the respective subblocks is calculated (S2507). A block having the most referenceable sides is selected, and it is determined whether or not the number of the subblocks having the maximum B_i value is one (S2509). When the number of the subblocks having the maximum B_i value is one, intra prediction encoding is performed on the corresponding subblock (S2511). When the number of the subblocks having the maximum B_i value is two or more, the number of the blocks capable of bi-directional prediction among the plurality of blocks is calculated (S2517). The bi-directional prediction refers to a case where referenceable peripheral blocks exist on both the left and right of the current subblock, or a case where referenceable peripheral blocks exist both above and below the current subblock. When the number of the subblocks having the maximum B_i value and capable of bi-directional prediction is one, intra prediction encoding is performed on the corresponding subblock (S2511). When there are no subblocks capable of bi-directional prediction encoding among the subblocks having the maximum B_i value, intra prediction encoding is performed on the first subblock in the raster scan order among the subblocks having the maximum B_i value. When there are a plurality of subblocks having the maximum B_i value and capable of bi-directional prediction, intra prediction encoding is performed on the first subblock in the raster scan order among the subblocks having the maximum B_i value and capable of bi-directional prediction (S2519, S2511). After performing the intra prediction encoding on the single subblock through the above-described method, it is determined whether the current intra-prediction encoded block is the last subblock (S2513). When there are subblocks remaining without being intra-prediction encoded, a total number T of the remaining intra subblocks is decremented by 1 (S2515), and the B_i value of the remaining subblocks is recalculated (S2507). The preceding processes are repeated on the intra subblocks remaining without being coded. After the entire intra subblocks are coded, the process is ended.

Figure 26:
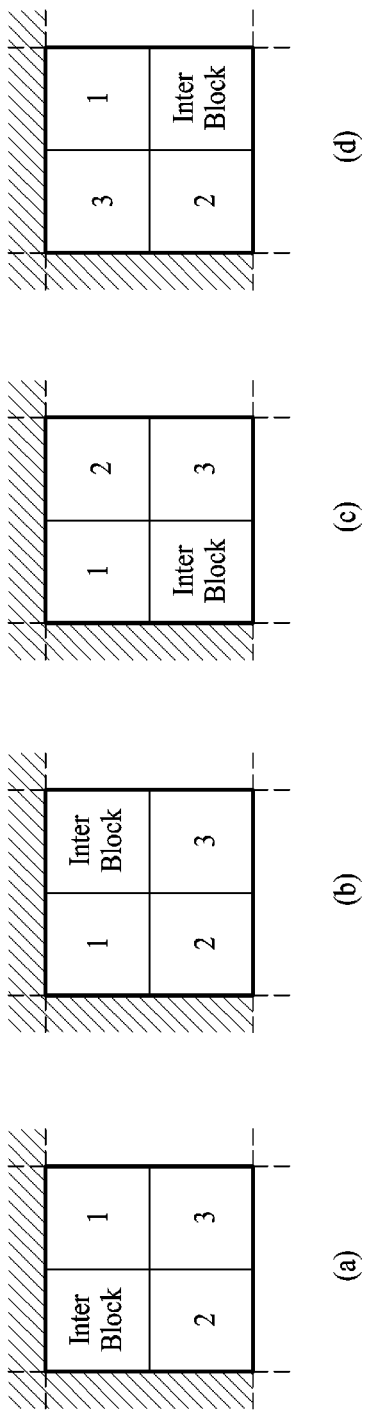
FIG. 26 is a diagram showing an exemplary sequence of coding subblocks where an extended coding block is set as 32×32 pixel sized-block with 16×16 pixel-block used for the internal blocks of the extended coding block.
Figure 27:
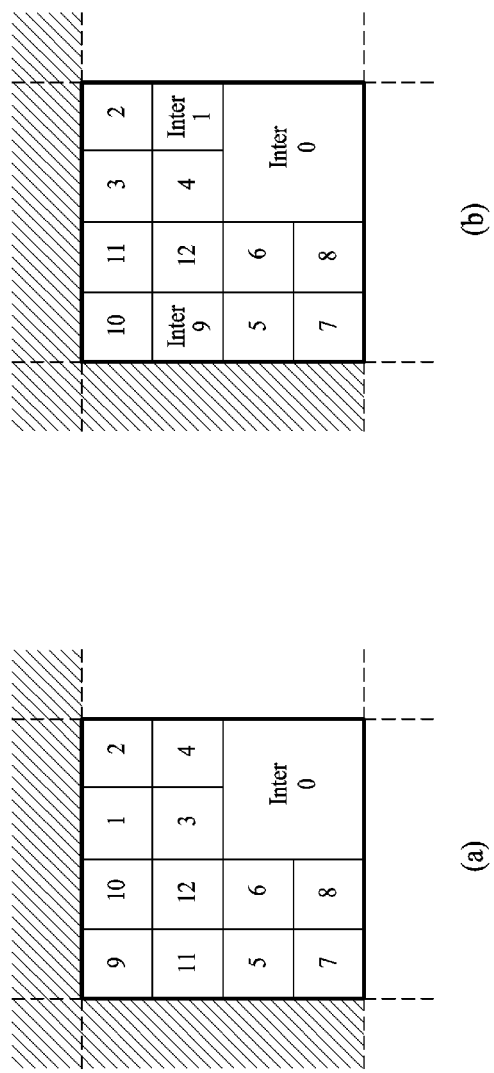
FIG. 27 is a diagram showing an exemplary sequence of coding subblocks where an extended coding block is set as 32×32 pixel sized-block with 4×4 pixel-block used for the internal blocks of the extended coding block.
Figure 28:
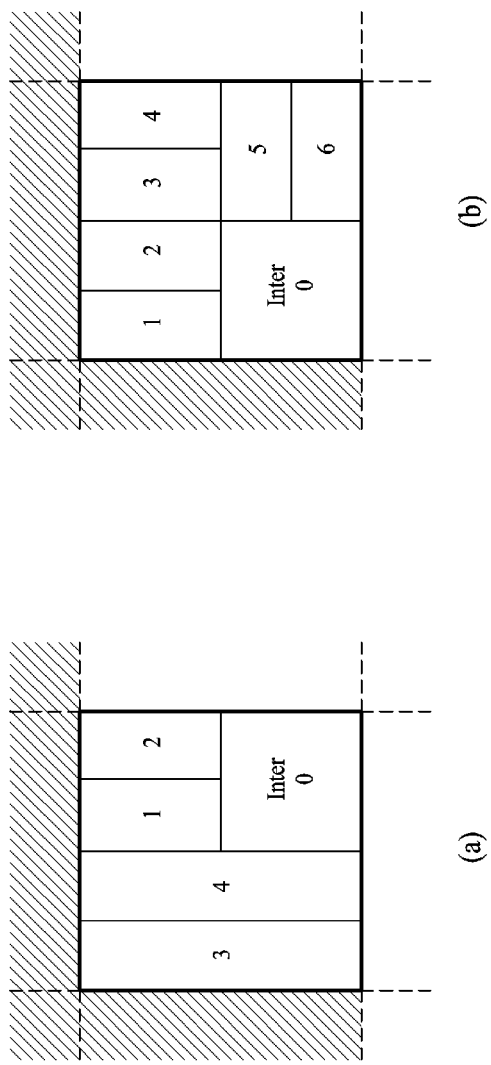
FIG. 28 is a diagram illustrating an adaptive scanning sequence when intra prediction is used for rectangular subblocks within an extended coding block.

FIG. 26 is a diagram an exemplary sequence of coding subblocks where a coding block is set as 32×32 pixel sized-block with 16×16 pixel-block used for the internal blocks of the coding block. FIG. 27 is a diagram showing an exemplary sequence of coding subblocks where a coding block is set as 32×32 pixel-block with 4×4 pixel-block used for the internal blocks of the coding block. When determining the coding order in FIG. 27, the method of FIG. 25 is hierarchically applied. When it is assumed in FIG. 27 that the size of the coding unit (CU) is 32×32, the coding order among four 16×16 sized blocks is determined by the method of FIG. 25, and the coding order of subblocks within the respective 16×16 blocks is determined by applying the algorithm of FIG. 25 to the subblocks within the 16×16 blocks. FIG. 28 is a diagram illustrating an adaptive scanning sequence when intra prediction is used for rectangular subblocks within a CU. Even when intra prediction blocks have various shapes and sizes (a square shape or a rectangular shape), the coding order can be easily determined by using the coding order determining method of FIG. 25.

FIGS. 26 to 28 illustrate a sequence of coding subblocks (a sequence of scanning blocks) where the entire subblocks within the CU are intra-prediction encoded. In the embodiment of the present disclosure, the adaptive block scanning sequences of FIGS. 26 to 28 have advantages that can determine the block scanning sequence according to patterns of peripheral usable pixels without additional bit transmission.

When inter prediction blocks and intra prediction blocks are mixed within the CU, the inter prediction blocks are first encoded and the intra prediction encoding blocks within the CU are then encoded, so as to increase the bi-directional prediction efficiency.

Figure 29:
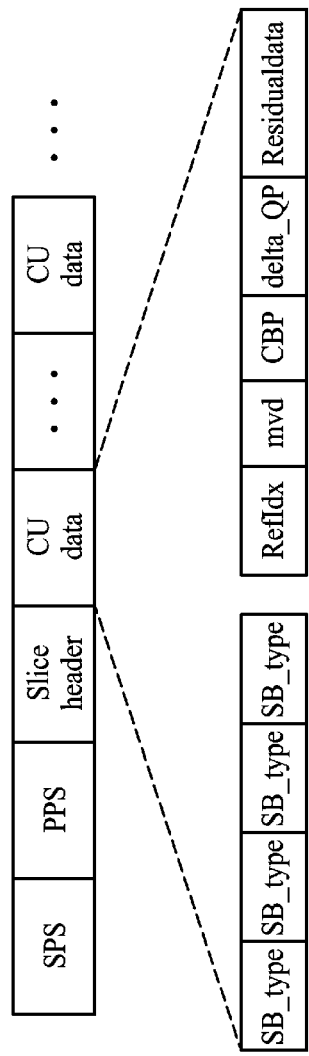
FIG. 29 is a diagram showing an exemplary syntax structure according to one or more embodiment of the present disclosure.

In the video encoding according to the embodiment of the present disclosure, the inter prediction encoding mode and the intra prediction encoding mode are mixed within the CU, and the respective subblocks within the CU have various shapes and sizes. In order to encode mode information and size information of the blocks, an additional flag bit is required. Due to the additional flag bit, a compression rate is reduced. In the embodiment of the present disclosure, the mode and shape/size information of the respective subblocks within the CU is located at the head of the CU information. In this case, pieces of the mode and shape/size information located at the head of the CU information are located in the raster scan order of subblocks within the CU. By using mode information (MB_type information) of the respective blocks received and decoded in the above order, the positions and shapes (structures) of the inter prediction encoding blocks and the intra prediction encoding blocks within the CU can be known. By using this information, the inter prediction encoded blocks within the CU can be first decoded. After the inter prediction encoded block is first decoded, the scan order of intra prediction encoded blocks within the CU can be calculated by using the method of FIG. 25, considering the positions of referenceable data among peripheral blocks of the CU and the positions of referenceable inter decoding blocks. By using such a method, block information can be transmitted, without transmitting additional bits. The syntax structure is shown in FIG. 29.

Figure 30:
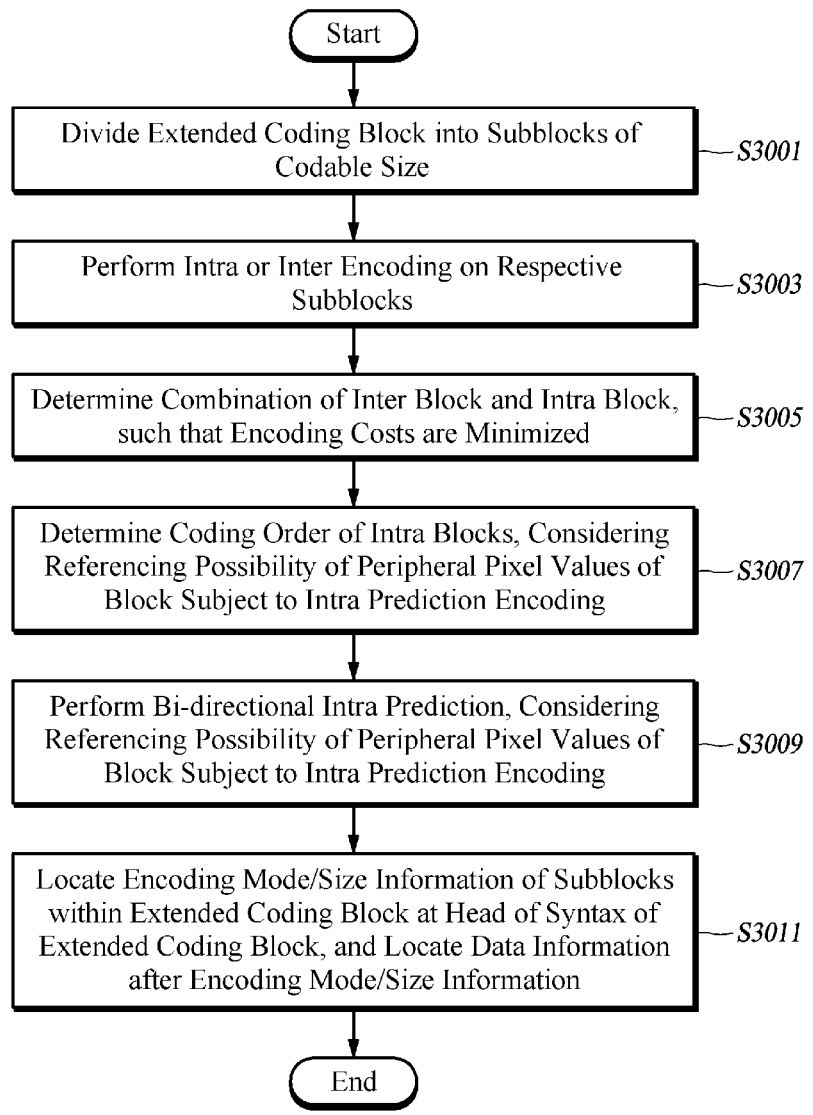
FIG. 30 is a flowchart of a method of encoding video by the video encoding apparatus of FIG. 5.

FIG. 30 is a flowchart of a video encoding method according to one or more embodiment of the present disclosure.

Referring to FIG. 30, the predictor 510 divides a CU into a combination of subblocks of codable size (S3001).

Subsequently, the predictor 510 performs intra or inter encoding on the respective subblocks within the CU (S3003). At this time, the predictor 510 determines a combination of subblocks by selecting inter blocks and intra blocks such that encoding costs are minimized with respect to an intra prediction mode or an inter prediction mode for the respective subblocks (S3005). With respect to blocks to be intra-prediction encoded among the respective subblocks, the coding order of intra encoding blocks within the CU can be determined, considering the referencing possibility of peripheral pixel values (S3007). Also, bi-directional intra prediction can be performed on a current block, considering the case where peripheral pixel values of the block to be intra-prediction encoded are referenceable (S3009).

The encoder 540 transmits information by locating encoding mode/size information of the subblocks within the CU at the head of the syntax of the CU, and locating data information after the encoding mode/size information (S3011).

Figure 31:
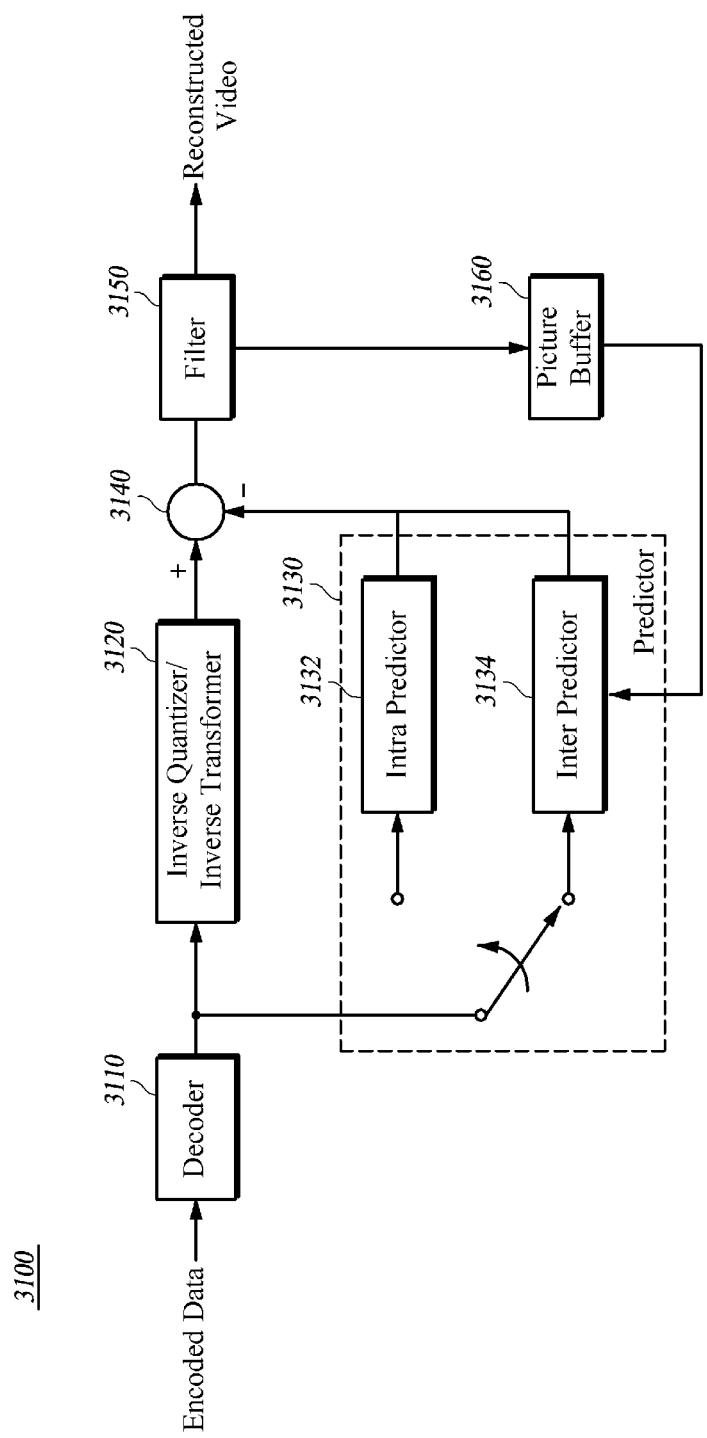
FIG. 31 is a diagram schematically showing a video decoding apparatus according to one or more embodiment of the present disclosure.

FIG. 31 is a block diagram schematically showing a video decoding apparatus according to one or more embodiment of the present disclosure. The video decoding apparatus 3100 according to one or more embodiment of the present disclosure may include a decoder 3110, an inverse quantizer/inverse transformer 3120, a predictor 3130, an adder 3140, a filter 3150, and a picture buffer 4560.

The decoder 3110 restores encoding mode and size information of subblocks within a CU by decoding encoded data, reconstructs inter prediction encoded blocks, based on the restored encoding mode information, determines the order of decoding intra prediction mode blocks according to the encoding mode and size information of the respective subblocks within the CU and referenceable conditions of peripheral blocks of the CU, and restores a quantized transform coefficient of a current block.

The inverse quantizer/inverse transformer 3210 reconstructs residual subblocks of the respective subblocks within the CU by inversely quantizing and inversely transforming the quantized transform coefficient.

The predictor 3130 generates predicted block by using the encoding mode and size information reconstructing the current block. For this purpose, the intra predictor 3132 generates predicted block of the target CU or subblocks thereof by performing intra prediction on the target CU to be decoded or subblocks thereof by using an intra prediction mode restored by the decoder 3110. The inter predictor 3134 generates prediction block of the target CU or subblocks thereof by performing inter prediction on the target CU to be decoded or subblocks thereof by using motion information restored by the decoder 3110.

The adder 3140 reconstructs the current block by adding the predicted block generated by the predictor 3130 to the residual block reconstructed by the inverse quantizer/inverse transformer 3120.

The target CU reconstructed by the adder 3140 is accumulated in units of pictures by deblocking filtering of the filter 3150, and is outputted as reconstructed video. The reconstructed video is stored in the picture buffer 4460, and may be used for predicting motion compensation in the inter predictor 4434.

Since the method of operating the intra predictor 4532, the inter predictor 4534, and the inverse quantizer/inverse transformer 4520 is substantially identical or similar to the method of operating the intra predictor 512, the inter predictor 514, and the inverse quantizer/inverse transformer 550 in the video encoding apparatus 500 described above with reference to FIG. 5, a detailed description thereof will be omitted.

Figure 32:
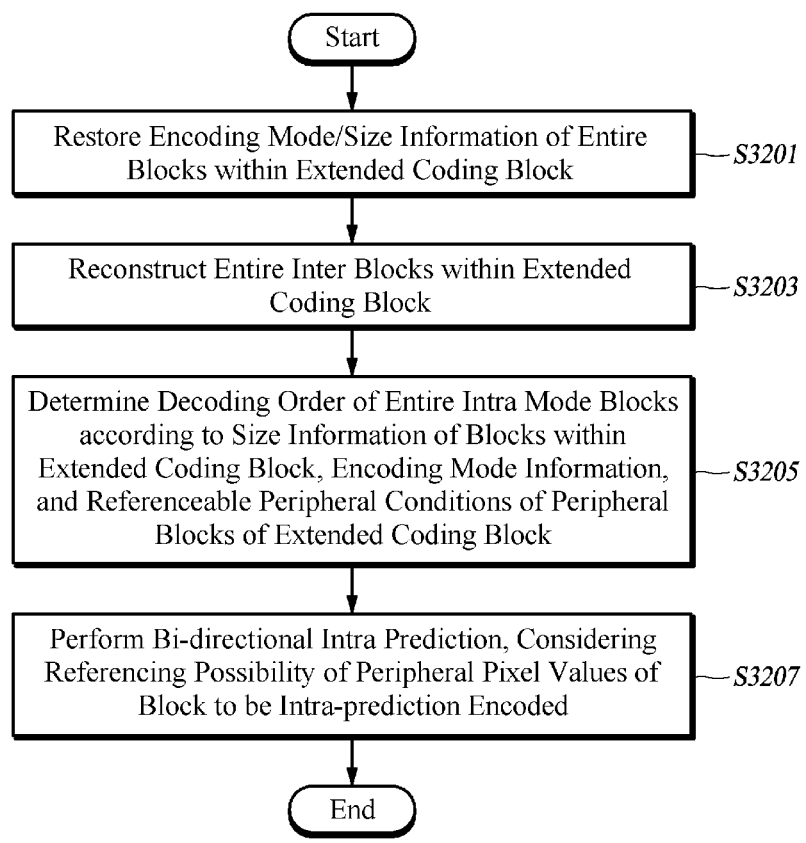
FIG. 32 is a flowchart of a method of decoding video by the video decoding apparatus of FIG. 31.

FIG. 32 is a flowchart of a method of decoding video by the video decoding apparatus of FIG. 31.

Referring to FIG. 32, the decoder 3110 restores encoding mode/size information of the entire blocks within the CU (S3201). Also, the decoder 3110 reconstructs the entire inter blocks within the extended CU, based on the restored encoding mode and size information (S3203). After the entire inter mode blocks within the CU are decoded, the decoder 3110 determines the decoding order of intra mode blocks according to size information and encoding mode information of the respective blocks within the, and referenceable conditions of peripheral blocks of the CU (S3205).

The intra predictor 3132 decodes the current block through bidirectional intra prediction, considering the case where peripheral pixel values of the block to be reconstructed can be referenced (S3207).

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of video encoding and decoding in that high-resolution videos can be encoded/decoded by using extended coding blocks wherein a single extended coding block is divided into differently sized blocks before entering the encoding/decoding performance as well as perform the encoding/decoding in units of extended coding block even with inter and intra modes combined.

CROSS-REFERENCE TO RELATED APPLICATION

If applicable, this application claims priority under 35 U.S.C. §119(a) of Patent Application No. 10-2010-0046176, filed on May 17, 2010 in Korea, the entire content of which is incorporated herein by reference. In addition, this non-provisional application claims priority in countries, other than the U.S., with the same reason based on the Korean Patent Application, the entire content of which is hereby incorporated by reference.

The invention claimed is:

1. An apparatus for encoding a coding unit, the apparatus comprising:
   a predictor configured
      to divide the coding unit into a plurality of subblocks,
      to determine respective prediction modes for respective subblocks of the plurality of subblocks of the coding unit from among a plurality of intra prediction modes and plurality of inter prediction modes,
      to determine, when the coding unit includes a plurality of intra prediction subblocks of the plurality of subblocks, an encoding order among the intra prediction subblocks within the coding unit by comparing numbers of reconstructed neighboring blocks that are available to respective ones of the intra prediction subblocks for use in intra prediction, wherein the intra prediction subblocks are subblocks to be predicted by respective intra predictions, and
      to perform each intra prediction for each of the intra prediction subblocks according to the determined encoding order to thereby generate each predicted block of said each of the intra prediction subblocks;
   a subtractor configured to generate each residual block of said each of the intra prediction subblocks, by subtracting said each predicted block of said each of the intra prediction subblocks from said each of the intra prediction subblocks;
   a transformer/quantizer configured to generate each quantized transform coefficient by transforming and quantizing said each residual block of said each of the intra prediction subblocks; and
   an encoder configured to generate encoded video data by encoding said each quantized transform coefficient into a bitstream.

2. The apparatus of claim 1, wherein the coding unit has a size of N×N, where N is an integer equal to or larger than 16.

3. The apparatus of claim 1, wherein the predictor is configured to divide the coding unit into any one of
   a combination of square subblocks,
   a combination of square and rectangular subblocks, and
   a combination of rectangular subblocks.

4. The apparatus of claim 1, wherein the plurality of intra prediction modes includes an intra prediction mode which references one or more pixels located below and on the right of said each of the intra prediction subblocks.

5. The apparatus of claim 1, wherein, when the coding unit includes one or more inter prediction subblocks and one or more intra prediction subblocks, the encoder is configured to first encode all the inter prediction subblocks within the coding unit prior to encoding the intra prediction subblocks within the coding unit, the inter prediction subblocks are subblocks to be predicted by respective inter predictions.

6. The apparatus of claim 1, wherein the predictor is configured to determine the encoding order for the intra prediction subblocks, such that the number of previously reconstructed neighboring blocks available for the intra prediction of said each of the intra prediction subblocks is maximized.

7. The apparatus of claim 6, wherein all of the subblocks within the coding unit are encoded in the intra prediction mode.

8. The apparatus of claim 7, wherein all of the subblocks within the coding unit are predicted by one or more of a square intra prediction mode and an arbitrary-rectangular intra prediction mode.

9. The apparatus of claim 6, wherein all of the subblocks within the coding unit are predicted by one or more of a square intra prediction mode, a square inter prediction mode, an arbitrary-rectangular intra prediction mode, and an arbitrary-rectangular inter prediction mode.

10. The apparatus of claim 1, wherein the encoder is configured to locate mode information and size information of each of the subblocks within the coding unit in front of coding unit information in a syntax of the bitstream.

11. The apparatus of claim 10, wherein the encoder is configured to locate the mode information and the size information, in a header of the coding unit, in the same order as a raster scan order of the subblocks within the coding unit.

12. The apparatus of claim 10, wherein the encoder is configured to omit additional bit transmission.

13. An apparatus for decoding a coding unit, the apparatus comprising:
    a video decoder configured
        to restore encoding mode information of a plurality of subblocks within the coding unit by decoding encoded data from a bitstream,
        to identify respective prediction modes for respective subblocks of the plurality of subblocks of the coding unit from among a plurality of intra prediction modes and a plurality of inter prediction modes, based on the restored encoding mode information,
        to determine, when the coding unit includes a plurality of intra prediction subblocks of the plurality of subblocks, a decoding order among the intra prediction subblocks within the coding unit, by comparing numbers of reconstructed neighboring blocks that are available to respective ones of each of the intra prediction subblocks for use in intra prediction, wherein the intra prediction subblocks are subblocks to be predicted by respective intra predictions, and
        to restore each quantized transform coefficient for said each of the intra prediction subblocks from the bitstream;
    an inverse quantizer/inverse transformer configured to generate each residual block for said each of the intra prediction subblocks by reconstructing said each residual subblock for said each of the intra prediction subblocks by inversely quantizing and inversely transforming said each quantized transform coefficient;
    a predictor configured to perform each intra prediction for said each of the intra prediction subblocks according to the determined decoding order to thereby generate each predicted block for said each of the intra prediction subblocks; and
    an adder configured to reconstruct said each of the intra prediction subblocks by adding said each predicted block for said each of the intra prediction subblocks to said each residual block for said each of the intra prediction subblocks.

14. A method for encoding a coding unit, the method comprising:
    dividing the coding unit into a plurality of subblocks;
    determining respective prediction modes for respective subblocks of the plurality of subblocks of the coding unit from among an intra prediction mode and an inter prediction mode;
    determining, when the coding unit includes a plurality of intra prediction subblocks of the plurality of subblocks, an encoding order among the intra prediction subblocks within the coding unit by comparing numbers of reconstructed neighboring blocks that are available to respective ones of each of the intra prediction subblocks for use in intra prediction, wherein the intra prediction subblocks are subblocks to be predicted by respective intra predictions; and
    performing each intra prediction for each of the intra prediction subblocks according to the determined encoding order to thereby generate each predicted block of said each of the intra prediction subblocks.

15. The method of claim 14, wherein the determining of the encoding order determines the encoding order for the intra prediction subblocks, such that the number of previously reconstructed neighboring blocks available for the intra prediction of said each of the intra prediction subblocks is maximized.

16. A method for decoding a coding unit, the method comprising:
    restoring encoding mode information of a plurality of subblocks within the coding unit by decoding encoded data from a bitstream;
    identifying respective prediction modes for respective subblocks of the plurality of subblocks of the coding unit from among a plurality of intra prediction modes and a plurality of inter prediction modes, based on the restored encoding mode information;
    determining, when the coding unit includes a plurality of intra prediction subblocks of the plurality of subblocks, a decoding order among the intra prediction subblocks within the coding unit, by comparing numbers of reconstructed neighboring blocks that are available to respective ones of each of the intra prediction subblocks for use in intra prediction, wherein the intra prediction subblocks are subblocks to be predicted by respective intra predictions;
    restoring each quantized transform coefficient for said each of the intra prediction subblocks from the bitstream;
    generating each residual block for said each of the intra prediction subblocks by reconstructing said each residual subblock for said each of the intra prediction subblocks by inversely quantizing and inversely transforming said each quantized transform coefficient;
    performing each intra prediction for said each of the intra prediction subblocks according to the determined decoding order to thereby generate each predicted block for said each of the intra prediction subblocks; and
    reconstructing said each of the intra prediction subblocks by adding said each predicted block for said each of the intra prediction subblocks to said each residual block for said each of the intra prediction subblocks.

17. The method of claim 16, further comprising decoding, when the coding unit includes one or more inter prediction subblocks and one or more intra prediction subblocks, the inter prediction subblocks and the intra prediction subblocks based on the restored encoding mode information, the inter prediction subblocks are subblocks to be predicted by respective inter predictions,
    wherein the decoding order within the coding unit for the intra prediction subblocks is determined after all the inter prediction subblocks are decoded.

* * * * *